(12) United States Patent
Lee

(10) Patent No.: US 11,693,418 B2
(45) Date of Patent: Jul. 4, 2023

(54) PATH PROVIDING DEVICE AND CONTROL METHOD THEREOF

(71) Applicant: LG Electronics Inc., Seoul (KR)

(72) Inventor: Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 16/744,699

(22) Filed: Jan. 16, 2020

(65) Prior Publication Data

US 2020/0225678 A1  Jul. 16, 2020

(30) Foreign Application Priority Data

Jan. 16, 2019 (WO) ................ PCT/KR2019/000649

(51) Int. Cl.
*G05D 1/02* (2020.01)

(52) U.S. Cl.
CPC ......... *G05D 1/0223* (2013.01); *G05D 1/0219* (2013.01)

(58) Field of Classification Search
CPC . G05D 1/0223; G05D 1/0219; G01C 21/3446
See application file for complete search history.

(56) References Cited

U.S. PATENT DOCUMENTS

2015/0197246 A1* 7/2015 Nagasaka ............. B60W 30/10
 701/1
2015/0354976 A1* 12/2015 Ferencz ............... G06V 20/588
 382/104
2017/0221366 A1   8/2017 An et al.
2018/0188742 A1* 7/2018 Wheeler ............... G08G 1/0969
2018/0224852 A1* 8/2018 Tanahashi ............. G05D 1/0055
2019/0329779 A1* 10/2019 D'sa ...................... G06N 20/20

FOREIGN PATENT DOCUMENTS

JP    2005140628    6/2005
KR    20160147120   12/2016
KR    101778560     9/2017
KR    20180058608   6/2018

* cited by examiner

*Primary Examiner* — Nicholas Kiswanto
*Assistant Examiner* — Renee LaRose
(74) *Attorney, Agent, or Firm* — Fish & Richardson P.C.

(57) ABSTRACT

A method of controlling a path providing device for a vehicle, where the method includes: receiving high-definition map data from a server; generating forward path information for the vehicle based on the high-definition map data; receiving, from sensors in the vehicle, sensing information related to an object outside the vehicle; and determining a validity of the object based on the forward path information, wherein the validity of the object relates to whether the object is likely to affect driving operations of the vehicle. Generating the forward path information includes: based on a destination having been set for the vehicle, generating the forward path information to include a path to the destination; and based on the destination not having been set for the vehicle, generating the forward path information to include a path on which the vehicle is most likely to travel.

19 Claims, 18 Drawing Sheets

[ V2X-LDM ]

[ eHorizon-ADASIS ]

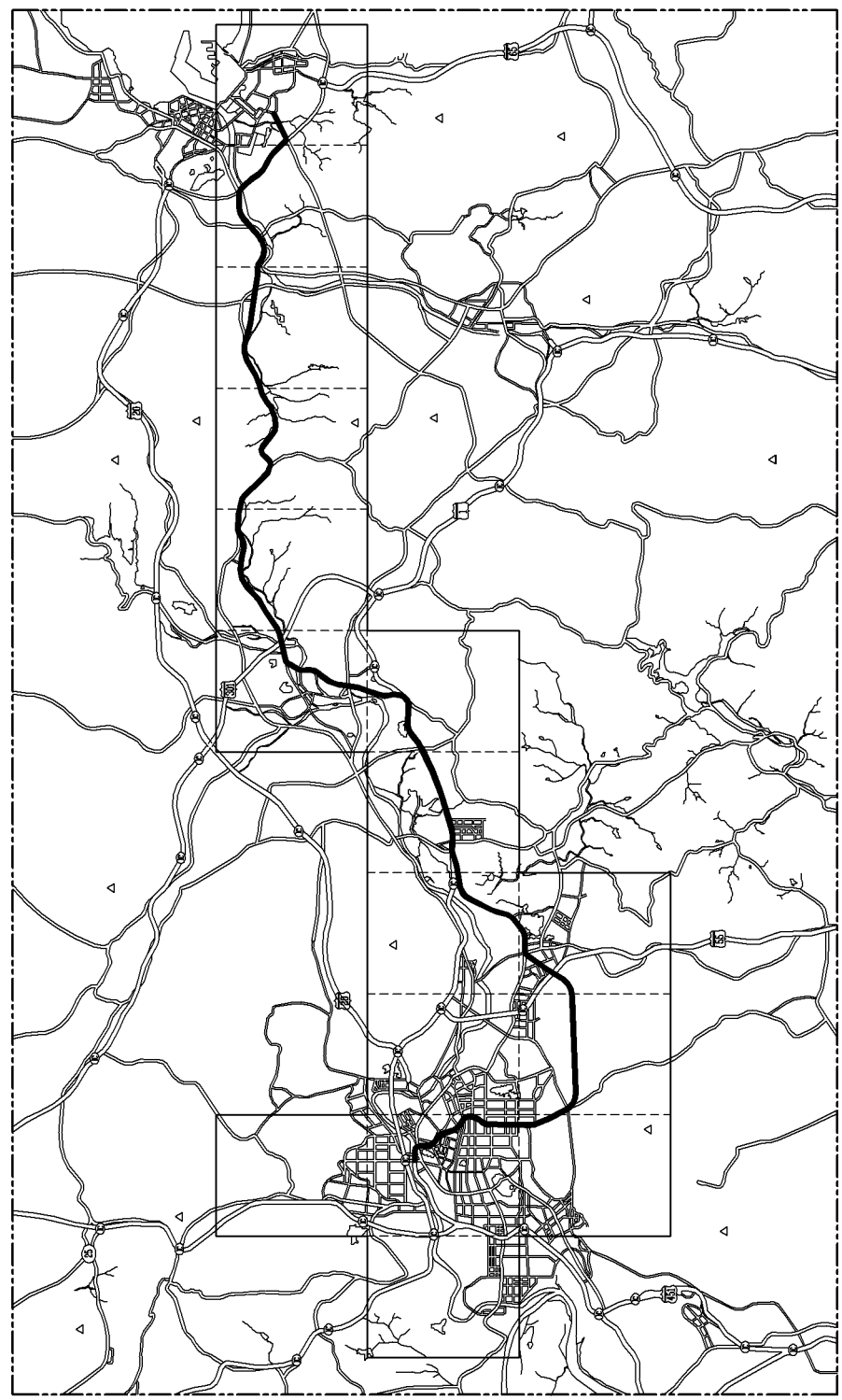

PATH PROVIDING DEVICE AND CONTROL METHOD THEREOF

CROSS-REFERENCE TO RELATED APPLICATIONS

Pursuant to 35 U.S.C. § 119(a), this application claims the benefit of an earlier filing date and right of priority to International Application No. PCT/KR2019/000649, filed on Jan. 16, 2019, the contents of which is incorporated by reference herein in its entirety.

TECHNICAL FIELD

The present disclosure generally relates to providing a path for a vehicle.

BACKGROUND

A vehicle is mechanism for transporting people or goods using kinetic energy. Representative examples of vehicles include automobiles and motorcycles.

For safety and convenience of a user who uses the vehicle, various sensors and devices are provided in the vehicle, and the functions of the vehicle are diversified.

The function of the vehicle may be divided into a convenience function for promoting the convenience of a driver and a safety function for promoting the safety of a driver and/or a pedestrian.

First, the convenience function has a motive for development related to driver convenience, such as giving an infotainment (information+entertainment) function to the vehicle, supporting a partial autonomous driving function, or assisting the driver's vision such as night vision or blind spot. For example, the convenience function may include an active cruise control (ACC) function, a smart parking assist system (SPAS) function, a night vision (NV) function, a head up display (HUD) function, an around view monitor (AVM) function, and an adaptive headlight system (AHS) function, and the like.

The safety function is a technology for securing the safety of the driver and/or the safety of a pedestrian, and may include a lane departure warning system (LDWS) function, a lane keeping assist system (LKAS) function, an autonomous emergency braking (AEB) function, and the like.

For convenience of a user using a vehicle, various types of sensors and electronic devices are provided in the vehicle. In particular, for the convenience of the user's driving, research on an advanced driver assistance system (ADAS) is being actively carried out. Furthermore, development of an autonomous vehicle is being actively carried out.

In recent years, as the development of an advanced driving assist system (ADAS) is actively undergoing, development of a technology for optimizing user's convenience and safety while driving a vehicle is required.

As part of this effort, in order to effectively transmit eHorizon (electronic Horizon) data to autonomous driving systems and infotainment systems, the EU OEM (European Union Original Equipment Manufacturing) Association has established a data specification and transmission method as a standard under the name "ADASIS (ADAS (Advanced Driver Assist System) Interface Specification)."

In addition, eHorizon (software) has become an essential element of the safety/ECO/convenience of autonomous vehicles under a connected environment.

SUMMARY

One general aspect of the present disclosure includes a path providing device configured to provide a path for a vehicle, the device including: a telecommunication unit, an interface unit, at least one processor; and at least one computer memory operably connectable to the at least one processor and storing instructions that, based on being executed by the at least one processor, perform operations including: receiving, through the telecommunication unit, high-definition map data from a server. The operations also include generating forward path information for the vehicle based on the high-definition map data. The operations also include receiving, through the interface unit from at least one sensor provided in the vehicle, sensing information related to an object outside the vehicle. The operations also include determining a validity of the object based on the forward path information, where the validity of the object relates to whether the object is likely to affect one or more driving operations of the vehicle, where generating the forward path information includes: based on a destination having been set for the vehicle, generating, based on the high-definition map data, the forward path information to include a path to the destination; and based on the destination not having been set for the vehicle, generating, based on the high-definition map data, the forward path information to include a path on which the vehicle is most likely to travel. Other embodiments of this aspect include corresponding computer systems, apparatus, and computer programs recorded on one or more computer storage devices, each configured to perform the actions of the methods.

Implementations may include one or more of the following features. The device where determining the validity of the object includes: classifying a plurality of roads, which are located within a predetermined range from the vehicle, into a first group and a second group, based on the forward path information; and determining the object to be valid based on the object being located on a road of the first group; and determining the object to be invalid based on the object being located on a road of the second group. The device where the operations further include: classifying, into the first group, (i) a main road, among the plurality of roads, that corresponds to the forward path information, and (ii) a sub road, among the plurality of roads, through which another vehicle is allowed to enter the main road; and classifying, into the second group, remaining roads, among the plurality of roads, except for the main road and the sub road. The device where the operations further include: calculating, based on a speed of the object, at least one of a location or a time at which the object is allowed to enter the main road; and selectively determining the sub road based on comparing (i) the calculated at least one of the location or the time with (ii) a preset criterion. The device where the sub road differs depending on at least one of a speed of the vehicle or a speed of the object. The device where the operations further include: adjusting a detectable range of the at least one sensor such that the at least one sensor senses the road included in the first group and does not sense the road included in the second group. The device where the operations further include: transmitting, through the interface unit, the forward path information to at least one additional sensor, other than the at least one sensor, provided in the vehicle. The device where the operations further include: selectively including, in the forward path information according to the validity of the object, object information related to the object. The device where the operations further include: excluding the object information from the forward path information based on the object moving out of a predetermined range from the vehicle. The device where the operations further include: transmitting, through the interface unit and based on a determination that the object is invalid, a control message for controlling the sensor not to sense the object. The device where the operations further include: based on a determination that the object is invalid, restricting at least one function that is executable in the vehicle from being executed as related to the object. The device where the operations further include: based on a determination that the object is valid, providing, to other sensors provided in the vehicle, object information related to the object for the other sensors to sense the object. The device where the operations further include: based on determining that the object is invalid, controlling the at least one sensor to reduce an amount of sensing information that is generated by the at least one sensor for the object. The device where the operations further include: transmitting, through the interface unit to the sensor provided in the vehicle, information regarding the validity of the object. The device where the operations further include: based on the destination not having been set, generating (i) a main path on which the vehicle is most likely to travel, and (ii) a sub path that merges with the main path; and based on a determination that the object is valid, generating a new sub path for which a probability that the object merges onto the main path via the sub path is greater than a threshold. Implementations of the described techniques may include hardware, a method or process, or computer software on a computer-accessible medium.

Another general aspect of the present disclosure includes a method of controlling a path providing device for providing a path for a vehicle, the method including: receiving high-definition map data from a server. The method also includes generating forward path information for the vehicle based on the high-definition map data. The method also includes receiving, from at least one sensor provided in the vehicle, sensing information related to an object outside the vehicle. The method also includes determining a validity of the object based on the forward path information, where the validity of the object relates to whether the object is likely to affect one or more driving operations of the vehicle, where generating the forward path information includes: based on a destination having been set for the vehicle, generating, based on the high-definition map data, the forward path information to include a path to the destination; and based on the destination not having been set for the vehicle, generating, based on the high-definition map data, the forward path information to include a path on which the vehicle is most likely to travel. Other embodiments of this aspect include corresponding computer systems, apparatus, and computer programs recorded on one or more computer storage devices, each configured to perform the actions of the methods.

Implementations may include one or more of the following features. The method where determining the validity of the object includes: classifying a plurality of roads, which are located within a predetermined range from the vehicle, into a first group and a second group, based on the forward path information; determining the object to be valid based on the object being located on a road of the first group; and determining the object to be invalid based on the object being located on a road of the second group. The method further including adjusting a detectable range of the at least one sensor such that the at least one sensor senses the road included in the first group and does not sense the road included in the second group. The method further including: selectively including, in the forward path information according to the validity of the object, object information related to the object; and transmitting the forward path information including the object information to sensors provided in the vehicle. The method further including: based on a determination that the object is invalid, restricting at least one function that is executable in the vehicle from being executed as related to the object. Implementations of the described techniques may include hardware, a method or process, or computer software on a computer-accessible medium.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWING

FIGS. 12A and 12B are diagrams illustrating examples of receiving a high-definition map data by a path providing device according to an implementation of the present disclosure;

DETAILED DESCRIPTION

Implementations are disclosed herein that adaptively control sensing and/or safety operations of a vehicle based on a likelihood that an external object will affect driving operations of the vehicle.

One aspect of the present disclosure is to provide a path providing device, capable of distinguishing whether an object (e.g., another vehicle) will affect driving or travel of a vehicle.

Another aspect of the present disclosure is to provide a path providing device which provides forward path information, so that sensors can monitor an object that is expected to affect driving or travel of the vehicle.

In some scenarios, implementations of the present disclosure may have one or more of the following technical effects.

According to implementations of the present disclosure, if an object is determined to be likely to affect driving of the vehicle, then one or more sensors and/or safety operations may be adjusted accordingly. For example, if the object is determined to be likely to affect driving operations, then one or more sensors of the vehicle may be controlled to continuously monitor the object. By contrast, for example, if the object is determined to be unlikely to affect driving of the vehicle, then the sensors may be controlled to reduce sensing (or stop sensing) of the object.

Implementations are not limited to controlling sensors, however. For example, one or more safety operations of the vehicle may be adaptively controlled based on whether the object is determined to be likely to affect driving of the vehicle, as described in more detail with reference to FIG. 14, below.

As such, by adaptively controlling the level of sensing and/or level of safety operations of the vehicle based on a likelihood of risk that an object presents, implementations disclosed herein may reduce unnecessary processing, storage, and/or resources of the vehicle. For example, one or more sensors of the vehicle may be operated to sense an object only under necessary situations according to the likelihood that the object will affect driving of the vehicle, thereby reducing loads and efficiently managing energy.

A vehicle according to an implementation of the present disclosure may include cars, motorcycles, and the like. Hereinafter, a vehicle will be described based on an example of a car.

The vehicle according to the implementation of the present disclosure may be powered by any suitable source. For example, a vehicle may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
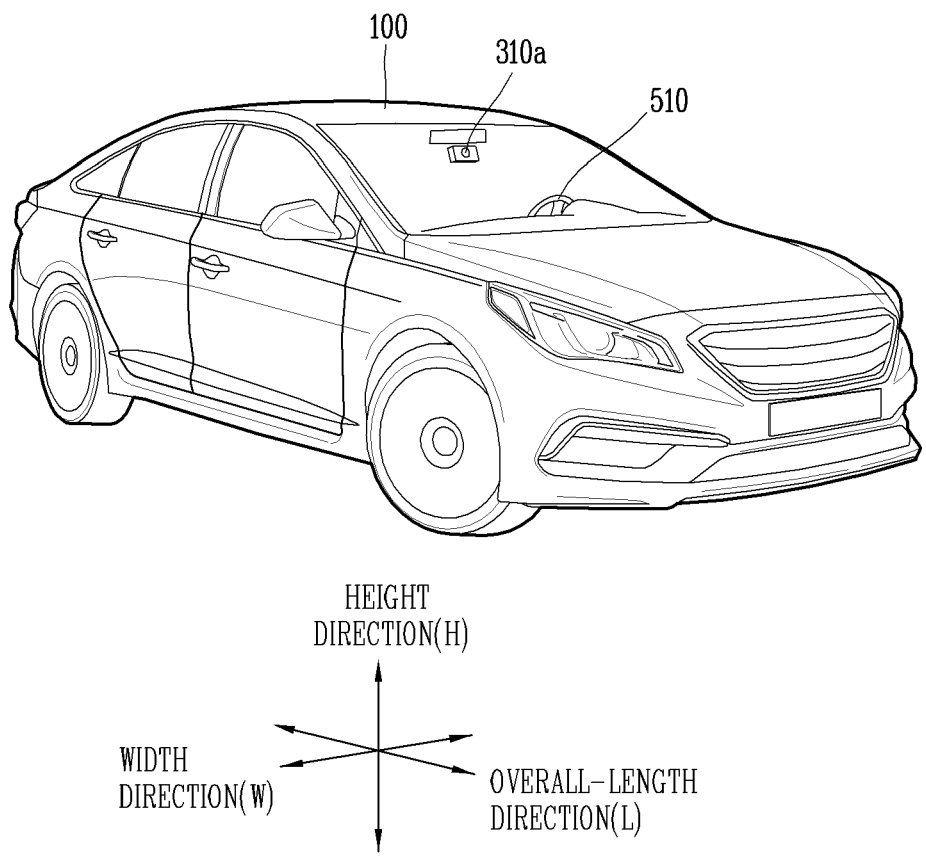
FIG. 1 is a diagram illustrating an example of an appearance of a vehicle according to an implementation of the present disclosure.

FIG. 1 is a diagram illustrating an appearance of a vehicle according to an implementation of the present disclosure.

Figure 2:
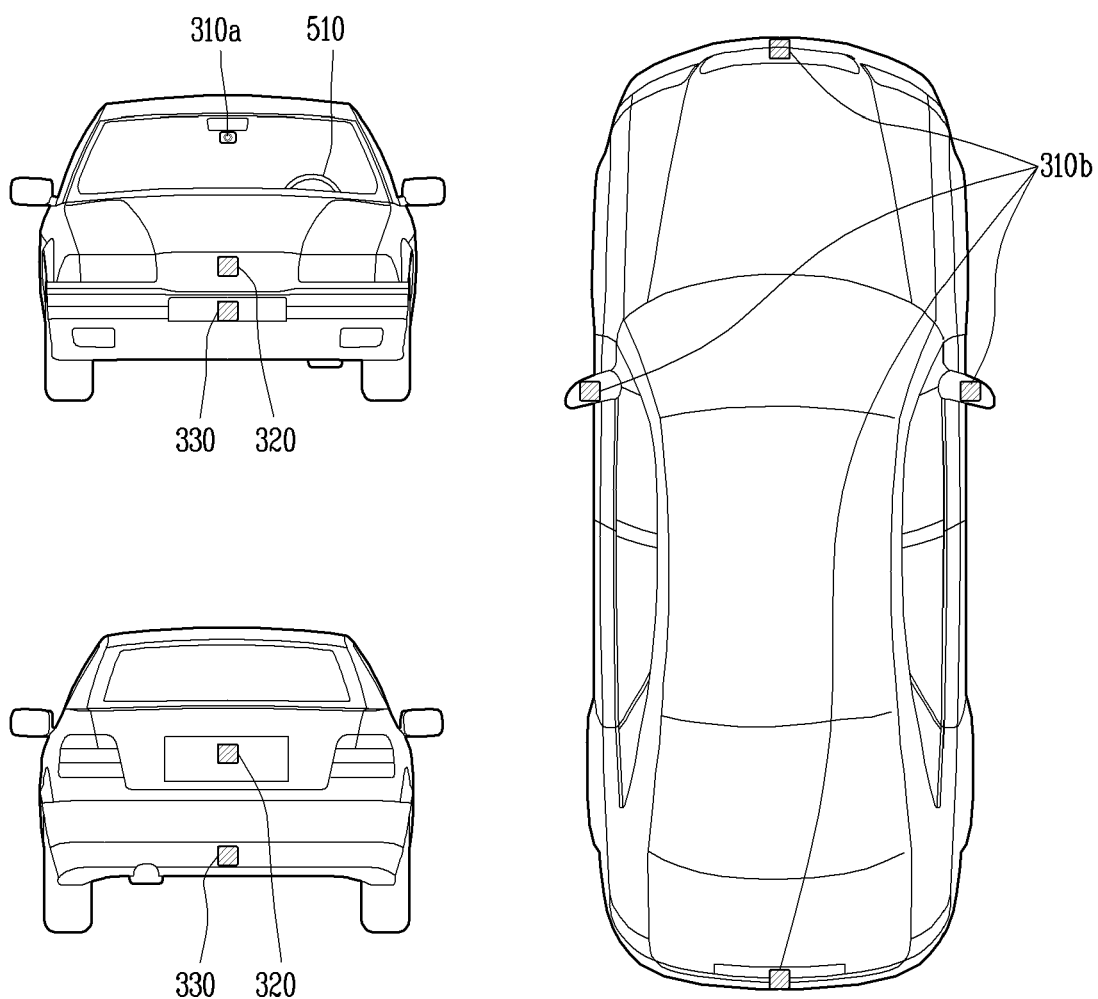
FIG. 2 is a diagram illustrating an example in which a vehicle according to an implementation of the present disclosure is viewed at various angles from the outside.

FIG. 2 is a diagram in which a vehicle according to an implementation of the present disclosure is viewed at various angles from the outside.

Figure 3:
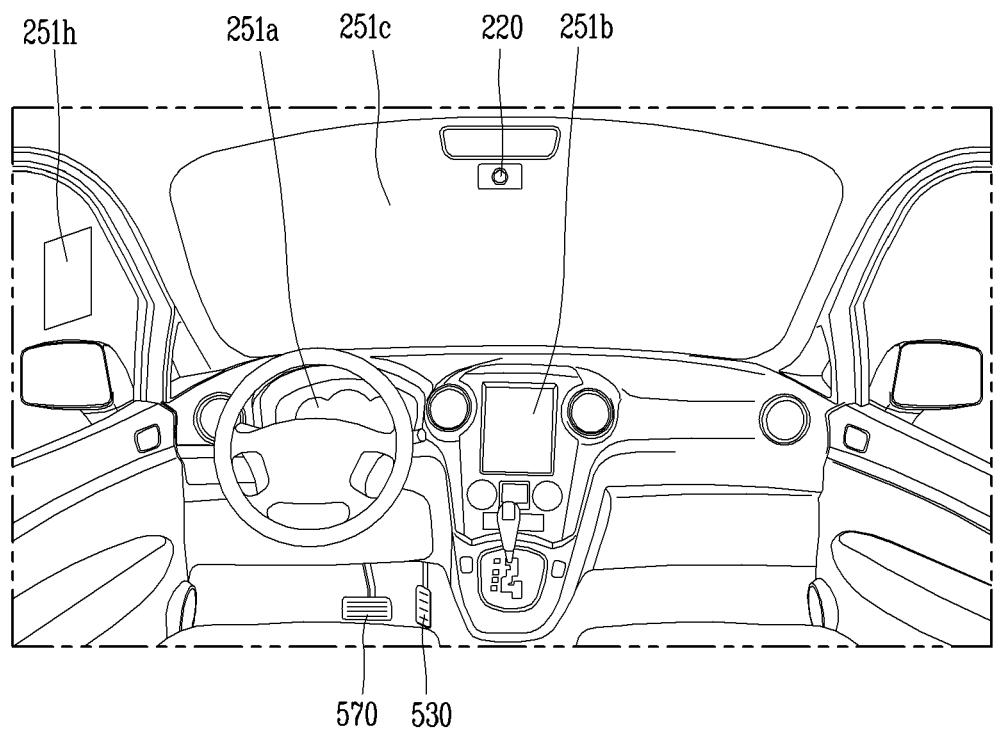
FIGS. 3 and 4 are diagrams illustrating an example of an inside of a vehicle according to an implementation of the present disclosure.
Figure 4:
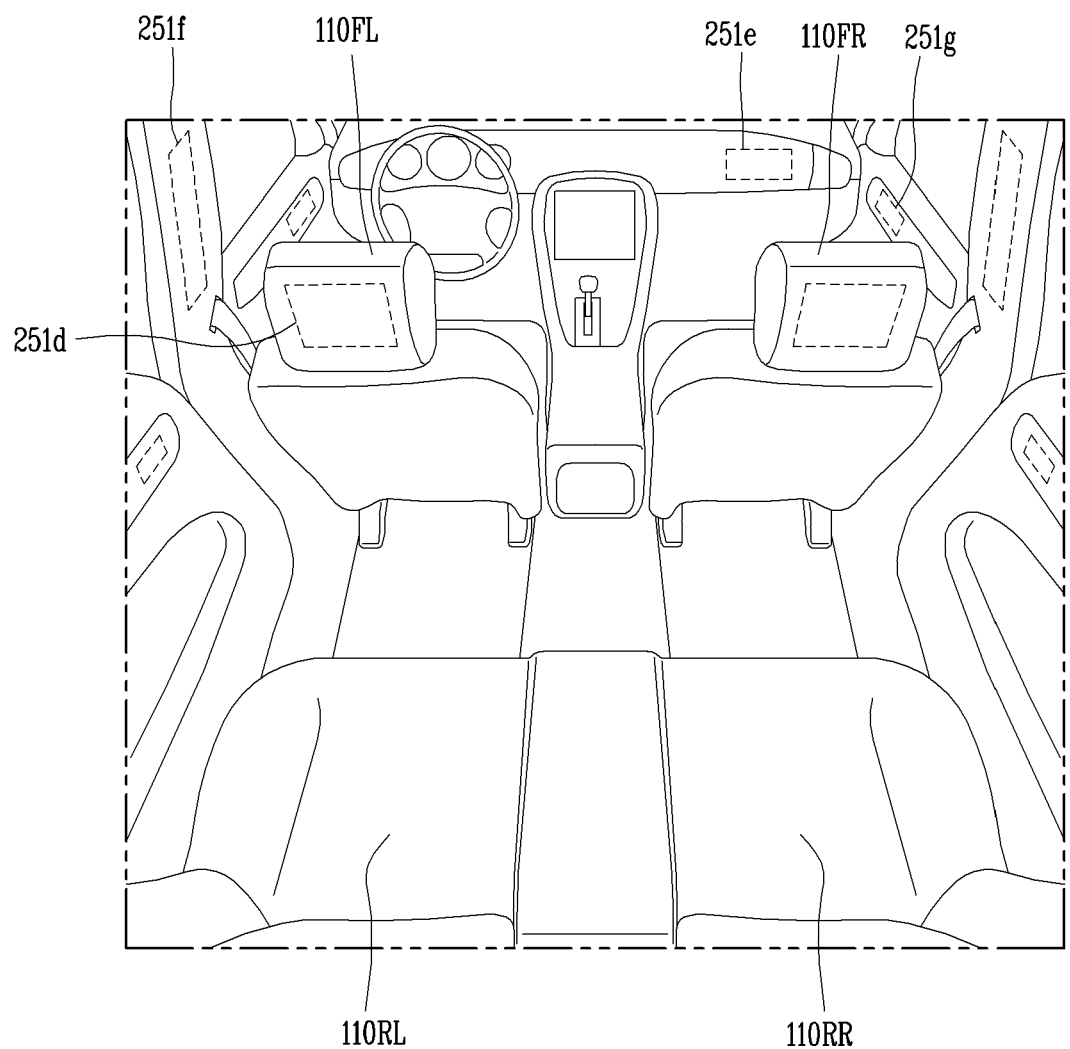

FIGS. 3 and 4 are diagrams illustrating an inside of a vehicle according to an implementation of the present disclosure.

Figure 5:
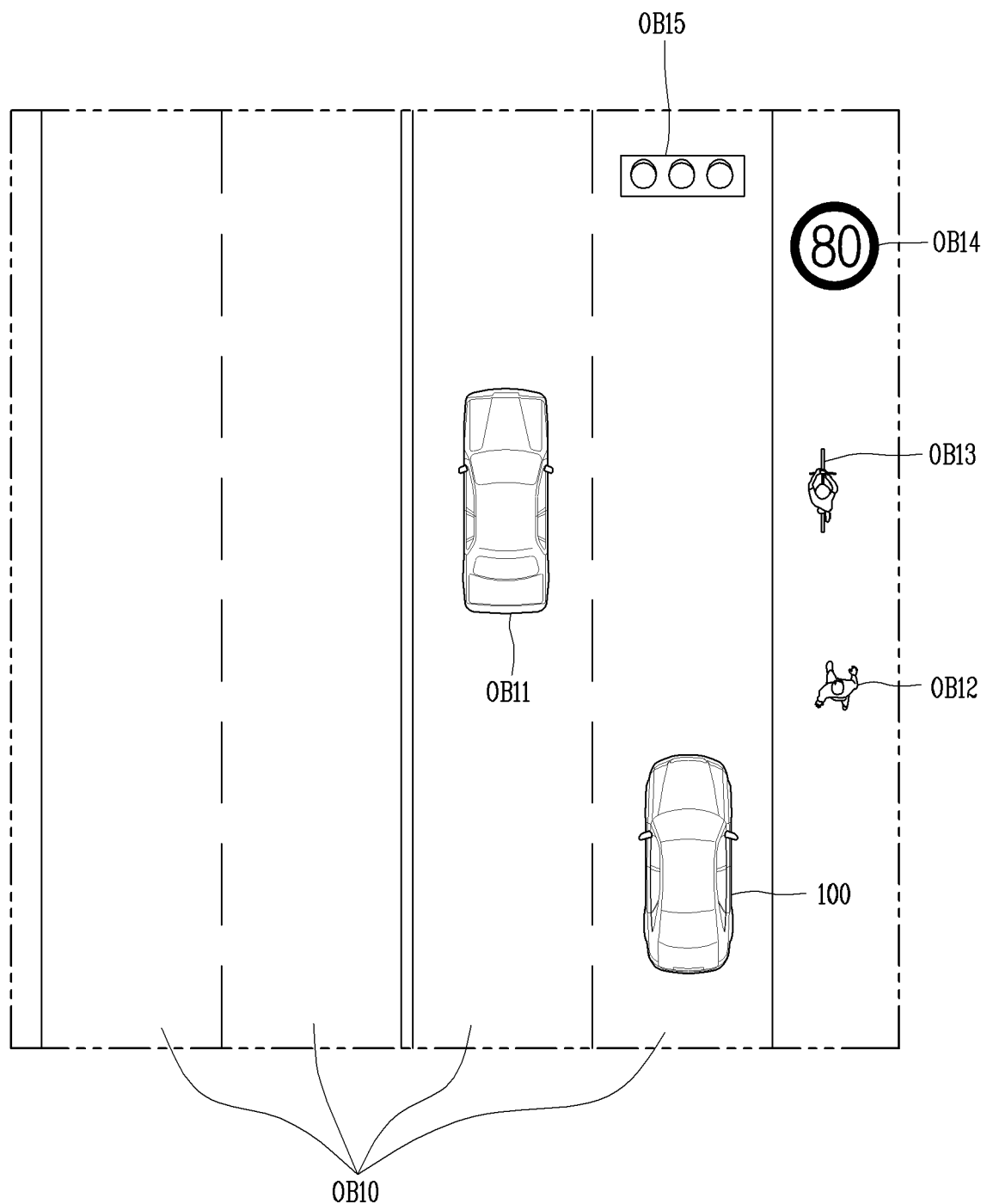
FIGS. 5 and 6 are diagrams referenced to describe examples of objects according to an implementation of the present disclosure.
Figure 6:
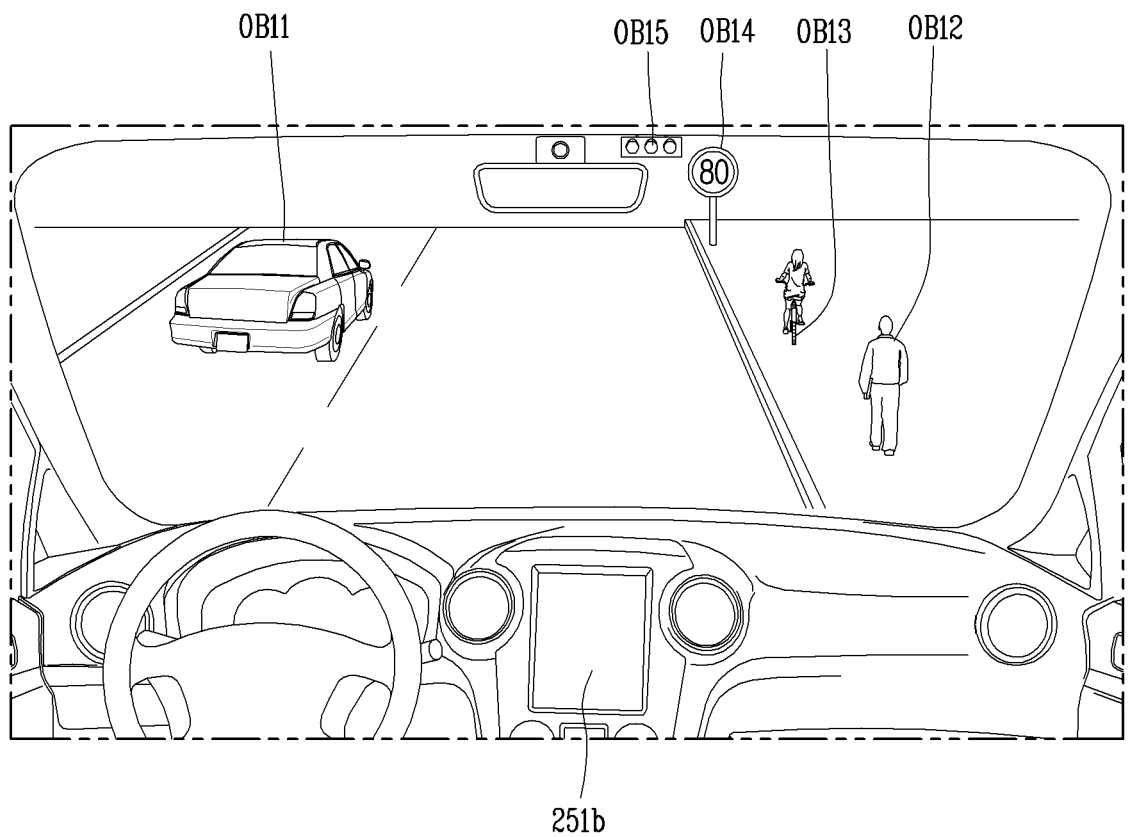

FIGS. 5 and 6 are diagrams referenced to describe objects according to an implementation of the present disclosure.

Figure 7:
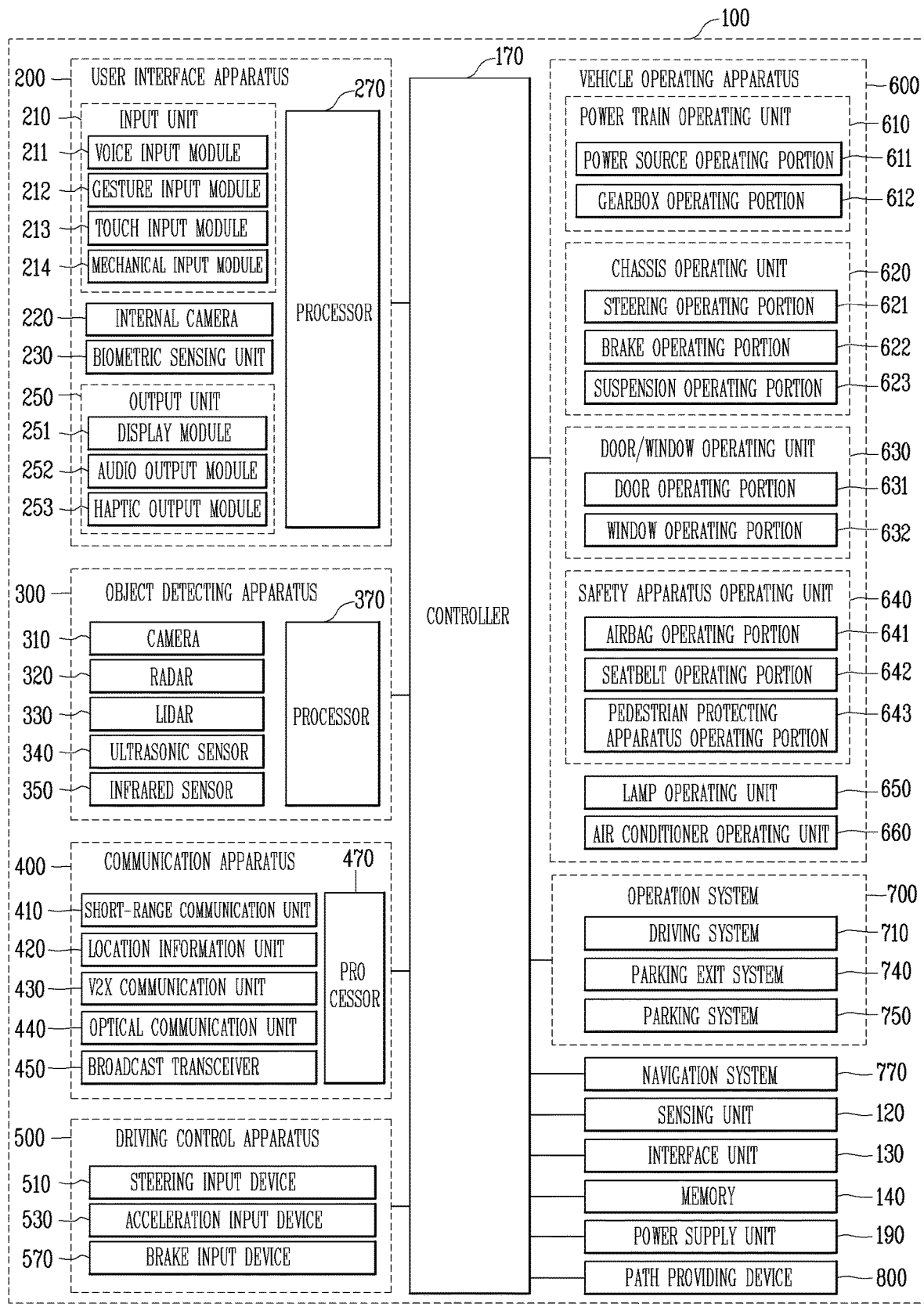
FIG. 7 is a block diagram referenced to describe an example of a vehicle according to an implementation of the present disclosure.

FIG. 7 is a block diagram referenced to describe a vehicle according to an implementation of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

In some implementations, the vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

For example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the vehicle 100 may be driven based on an operation system 700.

For example, the vehicle 100 may be driven based on information, data or signal generated in a driving system 710, a parking exit system 740 and a parking system 750.

When the vehicle 100 is driven in the manual mode, the vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in the example of FIG. 7, according to some implementations, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

According to some implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be another vehicle or a pedestrian. The fixed object may be, for example, a traffic signal, a road, or a structure.

The object detecting apparatus 300 may include a camera 310, a radar 320, a lidar 330, an ultrasonic sensor 340, an infrared sensor 350 and at least one processor, such as processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle. The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and at least one processor, such as processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

Meanwhile, the vehicle operating apparatus 600 may include at least one processor. Each unit of the vehicle operating apparatus 600 may individually include at least one processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include at least one processor. Each unit of the vehicle operating apparatus 600 may individually include at least one processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to implementations, the operation system 700 may further include other components in addition to components to be described, or may not include some of the components to be described.

Meanwhile, the operation system 700 may include at least one processor. Each unit of the operation system 700 may individually include at least one processor.

Meanwhile, according to some implementations, the operation system may implemented by the controller 170 when it is implemented in a software configuration.

Meanwhile, according to implementation, the operation system 700 may be implemented by at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and at least one processor. The memory may store the navigation information. The at least one processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a path providing device 800.

The path providing device 800 may control at least one of those components illustrated in FIG. 7. From this perspective, in some implementations, the path providing device 800 may be implemented by the controller 170.

Alternatively, in some implementations, the path providing device 800 may be a separate device, independent of the controller 170. When the path providing device 800 is implemented as a component independent of the controller 170, the path providing device 800 may be provided on a part of the vehicle 100.

Hereinafter, description will be given of implementations in which the path providing device 800 is a component which is separate from the controller 170, for the sake of explanation. As such, according to implementations described in this disclosure, the functions (operations) and control techniques described in relation to the path providing device 800 may be executed by the controller 170 of the vehicle. However, in general, the path providing device 800 may be implemented by one or more other components in various ways.

Furthermore, the path providing device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, a method of autonomously driving a vehicle associated with the present disclosure in an optimized manner or priding path information optimized for driving a vehicle will be described in more detail with reference to the accompanying drawings.

Figure 8:
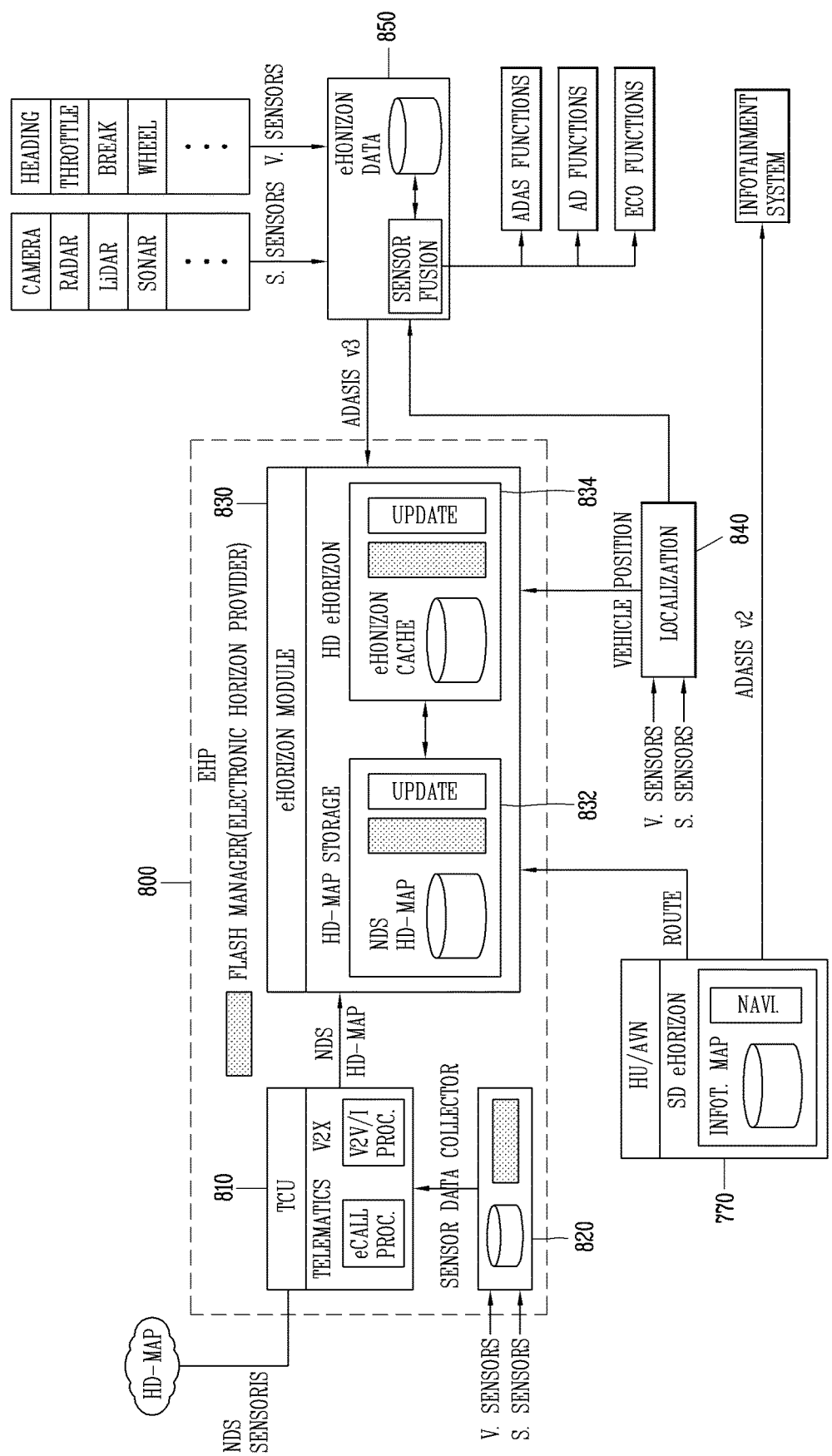
FIG. 8 is a diagram illustrating an example of an electronic horizon provider (EHP) associated with some implementations of the present disclosure.

FIG. 8 is a diagram for explaining an electronic horizon provider (EHP) associated with the present disclosure.

Referring to FIG. 8, a path providing device 800 associated with the present disclosure may control a vehicle 100 on the basis of eHorizon.

The path providing device 800 may be an EHP (Electronic Horizon Provider).

Here, Electronic Horizon may be referred to as "ADAS Horizon," "ADASIS Horizon," "Extended Driver Horizon" or "eHorizon."

The eHorizon may be understood as software, a module or a system that performs the functions of generating a vehicle's forward path information (e.g., using high-definition (HD) map data), configuring the vehicle's forward path information based on a specified standard (protocol) (e.g., a standard specification defined by the ADAS), and transmitting the configured vehicle forward path information to an application (e.g., an ADAS application, a map application, etc.) which may be installed in a module (for example, an ECU, a controller 170, a navigation system 770, etc.) of the vehicle or in the vehicle requiring map information (or path information).

In some systems, the vehicle's forward path (or a path to the destination) is only provided as a single path based on a navigation map (or a path to the destination).

By contrast, according to some implementations described in the present disclosure, eHorizon may provide lane-based path information based on a high-definition (HD) map. For example, by utilizing HD map data, more detailed and precise lane-based path information may be generated according to particular lanes of the road, thus enabling more detailed and accurate navigation for a user.

The data generated by eHorizon may be referred to as "electronic Horizon data" or "eHorizon data."

The electronic horizon data may be described with driving plan data used when generating a driving control signal of the vehicle 100 in a driving system. For example, the electronic horizon data may be understood as driving plan data within a range from a point where the vehicle 100 is located to the horizon.

Here, the horizon may be understood as a point in front of a predetermined distance from a point where the vehicle 100 is located, on the basis of a preset driving path. The horizon may denote a point at which the vehicle 100 can reach after a preset period of time from a point where the vehicle 100 is located along a preset driving path. Here, the driving path denotes a driving path to the final destination, and may be set by a user input.

The electronic horizon data may include horizon map data and the horizon pass data. The horizon map data may include at least one of topology data, ADAS data, HD map data, and dynamic data. According to an implementation, the horizon map data may include a plurality of layers. For example, the horizon map data may include a first layer matched with topology data, a second layer matched with ADAS data, a third layer matched with HD map data, and a fourth layer matched with dynamic data. The horizon map data may further include static object data.

The topology data may be described as a map created by connecting the center of the road. The topology data is suitable for roughly indicating the location of a vehicle, and may be in the form of data used primarily in navigation for a driver. The topology data may be understood as data regarding road information (excluding information regarding specific lanes of the road). The topology data may be generated based on data received at an infrastructure via V2I. The topology data may be based on data generated by the infrastructure. The topology data may be based on data stored in at least one memory provided in the vehicle 100.

The ADAS data may denote data related to road information. The ADAS data may include at least one of slope data of roads, curvature data of roads, and speed limit data of roads. The ADAS data may further include no overtaking section data. The ADAS data may be based on data generated by the infrastructure 20. The ADAS data may be based on data generated by the object detecting apparatus 300. The ADAS data may be referred to as road information data.

The HD map data may include topology information in a detailed lane unit of roads, connection information of each lane, feature information (e.g., traffic sign, lane marking/attribute, road furniture, etc.) for localization of a vehicle. The HD map data may be based on data generated by the infrastructure.

The dynamic data may include various dynamic information that can be generated on a road. For example, the dynamic data may include construction information, variable speed lane information, road surface state information, traffic information, moving object information, and the like. The dynamic data may be based on data received from the infrastructure 20. The dynamic data may be based on data generated by the object detecting apparatus 300.

The path providing device 800 may provide map data within a range from a point where the vehicle 100 is located to a horizon. The horizon pass data may be described as a trajectory that can be taken by the vehicle 100 within a range from a point where the vehicle 100 is located to a horizon. The horizon pass data may include data indicating a relative probability of selecting any one road at a decision point (e.g., a crossroad, a junction, an intersection, etc.). The relative probability may be calculated based on time taken to arrive at the final destination. For example, when the time taken to arrive at the final destination in case of selecting a first road is shorter than that in case of selecting a second road at a decision point, the probability of selecting the first road may be calculated higher than that of selecting the second road.

The horizon pass data may include a main path and a sub path. The main path may be understood as a trajectory connecting roads with a relatively high probability of being selected. The sub path may be merge with or diverge from at least one point on the main path. The sub path may be understood as a trajectory connecting at least any one road having a low relative probability of being selected on at least one decision point on the main path.

eHorizon may be classified into categories such as software, a system, and the like. The eHorizon denotes a configuration in which road shape information on a high-definition map under a connected environment such as an external server (cloud server), V2X (vehicle to everything) or the like and real-time events such as real-time traffic signs, road surface conditions, accidents and the like are merged to provide relevant information to autonomous driving systems and infotainment systems.

In other words, eHorizon may perform the role of transferring a precision map road shape and real time events in front of the vehicle to autonomous driving systems and infotainment systems under an external server/V2X environment.

In order to effectively transfer eHorizon data (information) transmitted (generated) from the eHorizon to autonomous driving systems and infotainment systems, a data specification and transmission method may be formed in accordance with a technical standard called "ADASIS (Advanced Driver Assistance Systems Interface Specification)."

The vehicle control device associated with the present disclosure may use information received (generated) from eHorizon for autonomous driving systems and/or infotainment systems.

For example, autonomous navigation systems may use information provided by eHorizon in the safety and ECO aspects.

In terms of the safety aspect, the vehicle 100 according to the present disclosure may perform an ADAS (Advanced Driver Assistance System) function such as LKA (Lane Keeping Assist), TJA (Traffic Jam Assist) or the like, and/or an AD (AutoDrive) function such as advance, road joining, lane change or the like using road shape information and event information received from eHorizon and surrounding object information sensed through sensors (e.g., in the localization unit 840) provided in the vehicle.

Furthermore, in terms of the ECO aspect, the path providing device 800 may receive inclination information, traffic light information, and the like on a front road from eHorizon to control the vehicle so as to achieve efficient engine output, thereby enhancing fuel efficiency.

The infotainment system may include convenience aspects.

For an example, the vehicle 100 may receive accident information, road surface condition information, and the like on a front road received from eHorizon to output them on a display unit (for example, HUD (Head Up Display), CID, Cluster, etc.) provided in the vehicle to provide guide information for allowing the driver to perform safe driving.

The eHorizon may receive the location information of various event information (e.g., road surface condition information, construction information, accident information, etc.) generated from a road and/or road specific speed limit information from the present vehicle 100 or other vehicles or collect them from an infrastructure (e.g., a measuring device, a sensing device, a camera, etc.) installed on a road.

Furthermore, the event information and the road specific speed limit information may be linked to map information or may be updated.

In addition, the location information of the event information may be divided into units of lanes.

Using the information, the eHorizon (or EHP) of the present disclosure may provide information required for autonomous driving system and infotainment systems to each vehicle based on a precision map capable of determining a road situation (or road information) in units of lanes.

In other words, the eHorizon provider (EHP) of the present disclosure may provide an absolute high-definition map using an absolute coordinate of information (for example, event information, location information of the present vehicle 100, etc.) associated with a road based on a high-definition map.

The information associated with a road provided by the eHorizon may be provided with information provided within a predetermined region (predetermined space) with respect to the present vehicle 100.

The EHP (Electronic Horizon Provider) may be understood as a component included in the eHorizon system to perform a function provided by the eHorizon (or eHorizon system).

The path providing device 800 of the present disclosure may be an EHP, as illustrated in FIG. 8.

According to some implementations, the path providing device 800 (EHP) of the present disclosure may receive a high-definition map (e.g., from an external server or cloud server), generate path information to a destination (e.g., in units of particular lanes of a road), and transmit the high-definition map and the path information (e.g., generated in units of lanes of the road) to a module or application (or program) of another vehicle that may need the map information and path information.

As a result, in some implementations, by utilizing high-definition map data, more detailed and precise path information may be generated according to particular lanes of the road, thus enabling more detailed and accurate lane-based navigation information for the user.

Referring to FIG. 8, an example of the overall structure of the electronic horizon system according to some implementations of the present disclosure is illustrated in FIG. 8.

The path providing device 800 (EHP) of the present disclosure may include a telecommunication control unit (TCU) 810 for receiving a high-definition (HD) map existing in a cloud server.

The telecommunication control unit 810 may be a communication apparatus 400 described above, and may include at least one of components included in the communication apparatus 400.

The telecommunication control unit 810 may include a telematics module or a V2X (vehicle to everything) module.

The telecommunication control unit 810 may receive a high-definition (HD) map according to the Navigation Data Standard (NDS) (or conforming to the NDS standard) from a cloud server.

In addition, the high-definition (HD) map may be updated by reflecting data sensed through a sensor provided in a vehicle and/or a sensor installed on an adjacent road according to a sensor ingestion interface specification (SENSORIS) which is a sensor ingestion interface specification.

The telecommunication control unit 810 may download a HD-map from a cloud server through the telematics module or the V2X module.

The path providing device 800 (EHP) of the present disclosure may include a sensor data collection unit 820. The sensor data collection unit 820 may collect (receive) information sensed through sensors (for example, sensors (V. sensors) (e.g., heading, throttle, break, wheel, etc.) for sensing the operation of a vehicle) and sensors (S. sensors) (e.g., camera, radar, LiDAR, sonar, etc.) for sensing the surrounding information of a vehicle).

The sensor data collection unit 820 may transmit the information sensed through the sensors provided in a vehicle to the telecommunication control unit 810 (or at least one processor, such as processor 830) to reflect the information on the high-definition map.

The telecommunication control unit 810 may update the high-definition map stored in the cloud server by transmitting the information transmitted from the sensor data collection unit 820 to the cloud server.

The path provision apparatus 800 (EHP) of the present disclosure may include a processor 830 (or an eHorizon module).

The processor 830 may control the telecommunication control unit 810 and the sensor data collection unit 820.

The processor 830 may store a high-definition map received through the telecommunication control unit 810, and update the high-definition map using information received through the sensor data collection unit 820. Such an operation may be carried out in the storage unit 832 of the processor 830.

The processor 830 may receive first path information from an AVN (Audio Video Navigation) or a navigation system 770.

The first path information, as path information provided in some systems, may simply be information for guiding a driving path to a destination. As such, the first path information provided in some systems provides only one path information, and does not distinguish between different lanes of the road.

On the other hand, according to implementations described in the present disclosure, when the processor 830 receives the first path information, the processor 830 may generate second path information for guiding a driving path to a destination set in the first path information in units of lanes (e.g., according to particular lanes of the road) using a high-definition (HD) map and the first path information. Such an operation may be carried out in the operation unit 834 of the processor 830.

Therefore, in some implementations, by utilizing HD map data, more detailed and precise forward path information may be generated according to particular lanes of the road, thus enabling more detailed and accurate lane-based navigation for the user.

In addition, the eHorizon system may include a localization unit 840 for locating a vehicle using information sensed through sensors (V. sensors, S. sensors) provided in the vehicle.

The localization unit 840 may transmit the location information of the vehicle to the processor 830 so as to match the location of the vehicle detected using the sensors provided in the vehicle with the high-definition map.

The processor 830 may match the location of the vehicle 100 to the high-definition map based on the location information of the vehicle.

The processor 830 may generate electronic horizon data. The processor 830 may generate horizon pass data.

The processor 830 may generate the electronic horizon data by reflecting the driving environment of the vehicle 100. For example, the processor 830 may generate the electronic horizon data based on the driving direction data and the driving speed data of the vehicle 100.

The processor 830 may merge the generated electronic horizon data with previously generated electronic horizon data. For example, the processor 830 may positionally connect horizon map data generated at a first time point with horizon map data generated at a second time point. For example, the processor 830 may positionally connect horizon pass data generated at a first time point with horizon pass data generated at a second time point.

The processor 830 may include a memory, an HD map processing unit, a dynamic data processing unit, a matching unit, and a path generation unit.

The HD map processing unit may receive HD map data from a server via the communication device. The HD map processing unit may store the HD map data. According to an implementation, the HD map processing unit may process and refine the HD map data. The dynamic data processing unit may receive dynamic data from the object detecting apparatus. The dynamic data processing unit may receive dynamic data from the server. The dynamic data processing unit may store dynamic data. According to an implementation, the dynamic data processing unit 172 may process and refine the dynamic data.

The matching unit may receive a HD map from the HD map processing unit 171. The matching unit may receive dynamic data from the dynamic data processing unit. The matching unit may generate horizon map data by matching the HD map data and the dynamic data.

According to an implementation, the matching unit may receive topology data. The matching unit may ADAS data. The matching unit may generate horizon map data by matching the topology data, the ADAS data, the HD map data, and the dynamic data. The path generation unit may generate horizon pass data. The path generation unit may include a main path generation unit and a sub path generation unit. The main path generation unit may generate main pass data. The sub path generation unit may generate sub pass data.

Furthermore, the eHorizon system may include a merge unit 850 that merges information (data) sensed by sensors provided in the vehicle with eHorizon data formed by the eHorizon module (controller).

For example, the merge unit 850 may update a high-definition map by merging sensor data sensed in the vehicle to a high-definition map corresponding to eHozion data, and provide the updated high-definition map to an ADAS function, an AD (AutoDrive) function or an ECO function.

In addition, in some implementations, the merge unit 850 may also provide the updated high-definition map to the infotainment system.

In FIG. 8, it is illustrated that the path providing device 800 (EHP) of the present disclosure includes only the telecommunication control unit 810, the sensor data collection unit 820, and the processor 830, but the present disclosure is not limited thereto.

The path providing device 800 (EHP) of the present disclosure may further include at least one of a localization unit 840 and a merge unit 850.

In addition, the path providing device 800 (EHP) of the present disclosure may further include a navigation system 770.

Through the above arrangement, when at least one of the localization unit 840, the merge unit 850, and the navigation system 770 is included in the path providing device 800 (EHP) of the present disclosure, it may be understood that the function/operation/control carried out by the component included therein is carried out by the processor 830.

Figure 9:
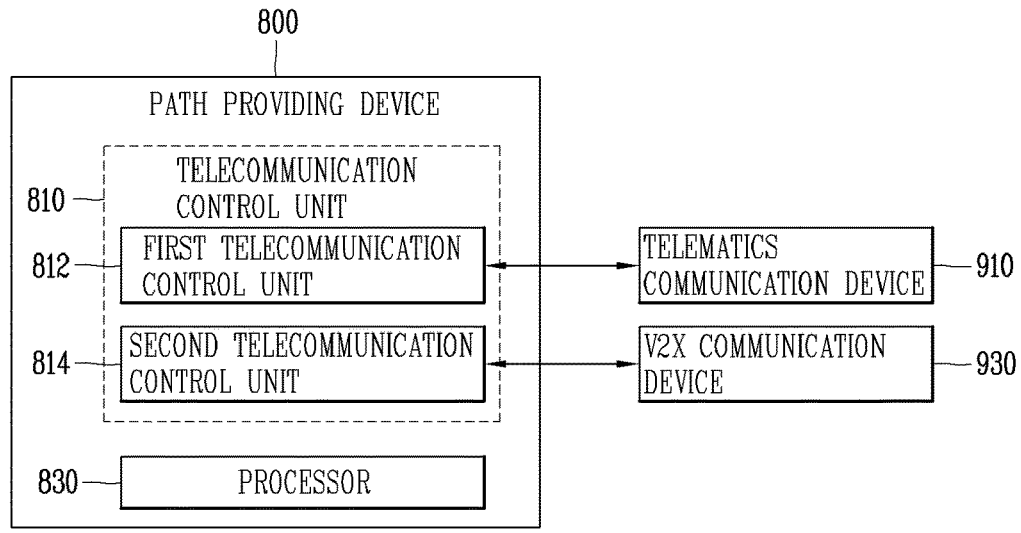
FIG. 9 is a block diagram illustrating an example of a path providing device (e.g., the path providing device of FIG. 8) in more detail.

FIG. 9 is a block diagram for explaining the path providing device of FIG. 8 in more detail.

The path providing device denotes a device for providing a path to a vehicle.

For example, the path providing device may be a device mounted on a vehicle to perform communication via CAN communication, and generate a message for controlling a vehicle and/or an electrical part mounted on the vehicle.

For another example, the path providing device may be located outside the vehicle, such as a server or a communication device, to communicate with the vehicle through a mobile communication network. In this case, the path providing device may remotely control the vehicle and/or the electrical part mounted on the vehicle using the mobile communication network.

The path providing device 800 is provided in the vehicle, and may be configured with an independent device that is attachable and detachable from the vehicle, or may be a component of the vehicle installed integrally with the vehicle.

Referring to FIG. 9, the path providing device 800 includes a telecommunication control unit 810 and a processor 830.

The telecommunication control unit 810 is configured to perform communication with various components provided in the vehicle.

For an example, the telecommunication control unit 810 may receive various information provided through a controller area network (CAN).

The telecommunication control unit 810 includes a first telecommunication control unit 812, and the first telecommunication control unit 812 may receive a high-definition map provided through telematics. In other words, the first telecommunication control unit 812 performs "telematics communication." The telematics communication may perform communication with a server or the like using a satellite navigation system satellite or a base station provided by mobile communication such as 4G and 5G.

The first telecommunication control unit 812 may perform communication with a telematics communication device 910. The telematics communication device may include a server provided by a portal provider, a vehicle provider, and/or a mobile communication company.

The processor 830 of the path providing device 800 of the present disclosure may determine the absolute coordinates of information (event information) related to a road based on the ADAS MAP received from an external server (eHorizon) through the telecommunication control unit 812. In addition, the processor 830 may perform autonomous driving or vehicle control on the present vehicle using the absolute coordinates of information (event information) related to the road.

The telecommunication control unit 810 includes a second telecommunication control unit 814, and the second telecommunication control unit 814 may receive various information provided through V2X (Vehicle to everything). In other words, the second telecommunication control unit 814 is configured to perform "V2X communication." V2X communication may be defined as a technology that exchanges information such as traffic situation while communicating with road infrastructure and other vehicles while driving.

The second telecommunication control unit 814 may perform communication with a V2X communication device 930. The V2X communication device may include a mobile terminal possessed by a pedestrian or a bicycle rider, a stationary terminal installed on a road, another vehicle, and the like.

Here, the another vehicle may denote at least one of vehicles existing within a predetermined distance with respect to the present vehicle 100 or vehicles entering a predetermined distance with respect to the present vehicle 100.

The present disclosure may not be necessarily limited thereto, and the another vehicle may include all vehicles capable of communicating with the telecommunication control unit 810. In the present specification, for the sake of convenience of explanation, a case where the nearby vehicle exists within a predetermined distance from the present vehicle 100 or enters within the predetermined distance will be described as an example.

The predetermined distance may be determined based on a communicable distance through the telecommunication control unit 810, determined according to the specification of a product, or may be determined or varied based on a user's setting or the standard of V2X communication.

The second telecommunication control unit 814 may be formed to receive LDM data from another vehicle. The LDM data may be a V2X message (BSM, CAM, DENM, etc.) transmitted and received between vehicles through V2X communication.

The LDM data may include the location information of another vehicle.

Based on the location information of the present vehicle and the location information of another vehicle included in LDM data received through the second telecommunication control unit 814, the processor 830 may determine a relative location between the present vehicle and another vehicle.

Furthermore, the LDM data may include the speed information of another vehicle. The processor 830 may also determine a relative speed of another vehicle using the speed information of the present vehicle and the speed information of the another vehicle. The speed information of the present vehicle may be calculated using a degree to which the location information of the vehicle changes over time or calculated based on information received from the driving control apparatus 500 or the power train operating unit 610 of the vehicle 100.

The second telecommunication control unit 814 may be the V2X communication unit 430 described above.

The telecommunication control unit 810 is a component for performing communication with a device located outside the vehicle 100 through wireless communication, while the interface unit 820 is a component for performing communication with a device located inside the vehicle using wired and wireless communications.

The interface unit 810 may receive information related to the driving of the vehicle from most of the electrical parts provided in the vehicle. Information transmitted from an electrical part provided in the vehicle 100 to the path providing device 800 is referred to as "vehicle driving information."

As one example, when the electrical part is a sensor, the vehicle driving information may be sensing information obtained by the sensor.

The vehicle driving information includes vehicle information and surrounding information of the vehicle. The information related to an inside of the vehicle with respect to the frame of the vehicle 100 may be defined as vehicle information, and the information related to an outside of the vehicle may be defined as surrounding information.

Vehicle information denotes information regarding the vehicle itself. For example, the vehicle information may include at least one of a driving speed of the vehicle, a driving direction, an acceleration, an angular speed, a position (GPS), a weight, a number of vehicle occupants, a braking force of the vehicle, a maximum braking force of the vehicle, an air pressure of each wheel, a centrifugal force applied to the vehicle, a driving mode of the vehicle (whether it is an autonomous driving mode or a manual driving mode), a parking mode of the vehicle (autonomous parking mode, automatic parking mode, manual parking mode), whether or not a user is on board the vehicle, information related to the user, and the like.

The surrounding information denotes information relate to another object located within a predetermined range around the vehicle and information related to the outside of the vehicle. The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

In addition, the surrounding information may include an ambient brightness, a temperature, a sun position, surrounding object information (a person, a vehicle, a sign, etc.), a type of road surface during driving, a geographic feature, line information, driving lane Information, and information required for autonomous driving/autonomous parking/automatic parking/manual parking mode.

Furthermore, the surrounding information may further include a distance from an object existing around the vehicle to the vehicle, a possibility of collision, a type of the object, a parking space for the vehicle, an object for identifying the parking space (e.g., a parking line, a string, another vehicle, a wall, etc.), and the like.

The vehicle driving information is not limited to the example described above and may include all information generated from the components provided in the vehicle.

Meanwhile, the processor 830 is configured to control one or more devices provided in the vehicle using the interface unit 810.

Specifically, the processor 830 may determine whether at least one of a plurality of preset conditions is satisfied based on vehicle driving information received through the telecommunication control unit 810. Depending on the satisfied conditions, the processor 830 may control the one or more electrical parts in different ways.

In connection with the preset condition, the processor 830 may sense the occurrence of an event in an electronic unit and/or application provided in the vehicle and determine whether the sensed event satisfies the preset condition. At this time, the processor 830 may detect the occurrence of an event from information received through the telecommunication control unit 810.

The application may be implemented, for example, as a widget, a home launcher, and the like, and refer to various types of programs that can be executed on the vehicle. Accordingly, the application may be a program that performs various functions, such as a web browser, video playback, message transmission/reception, schedule management, and application update.

In addition, the application may include forward collision warning (FCW), blind spot detection (BSD), lane departure warning (LDW), pedestrian detection (PD), curve speed warning (CSW), and turn-by-turn navigation (TBT).

For example, an event may occur when there is a missed call, when there is an application to be updated, when a message arrives, start on, start off, autonomous driving on/off, LCD awake key, alarm, incoming call, missed notification, or the like.

For another example, an event may occur when a warning set by an advanced driver assistance system (ADAS) occurs or a function set by the ADAS is performed. For example, when a forward collision warning occurs, when a blind spot detection occurs, when a lane departure warning occurs, when a lane keeping assist warning occurs, when autonomous emergency braking function is performed, or the like may be seen as an occurrence of an event.

For still another example, when changed from a forward gear to a reverse gear, when an acceleration greater than a predetermined value is generated, when a deceleration greater than a predetermined value is generated, when a power device is changed from an internal combustion engine to a motor, when changed from the motor to the internal combustion engine, or the like may also be seen as an occurrence of an event.

In addition, when various ECUs provided in the vehicle perform a specific function may also be seen as an occurrence of an event.

For an example, when the occurred event satisfies a preset condition, the processor 830 controls the telecommunication control unit 810 to display information corresponding to the satisfied condition on the one or more displays.

Figure 10:
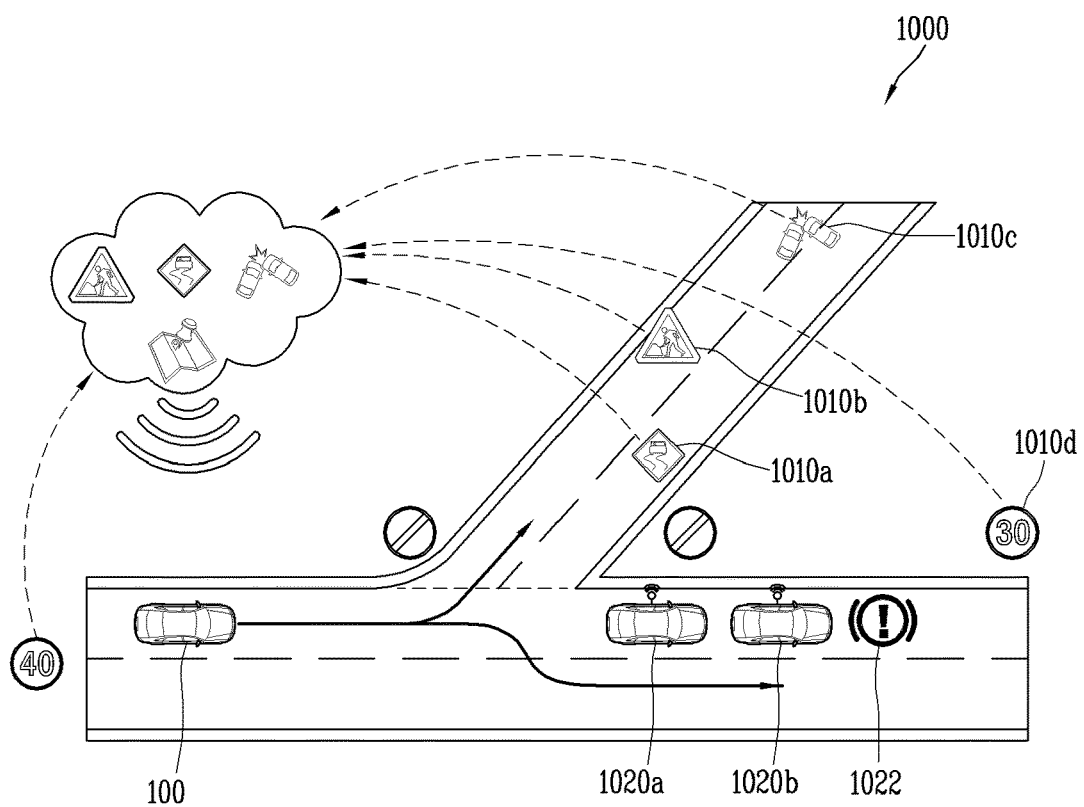
FIG. 10 is a diagram illustrating an example of eHorizon associated with some implementations of the present disclosure.

FIG. 10 is a conceptual diagram for explaining eHorizon associated with the present disclosure.

Referring to FIG. 10, the path providing device 800 associated with the present disclosure may allow a vehicle 100 to autonomously drive on the basis of eHorizon.

eHorizon may be classified into categories such as software, a system, and the like. eHorizon denotes a configuration in which road shape information on a precision map under a connected environment such as an external server (cloud), V2X (vehicle to everything) or the like and real-time events such as real-time traffic signs, road surface conditions, accidents and the like are merged to provide relevant information to autonomous driving systems and infotainment systems.

For an example, eHorizon may refer to an external server (or cloud, cloud server).

In other words, eHorizon may perform the role of transferring a precision map road shape and real time events in front of the vehicle to autonomous driving systems and infotainment systems under an external server/V2X environment.

In order to effectively transfer eHorizon data (information) transmitted from the eHorizon (i.e., external server) to autonomous driving systems and infotainment systems, a data specification and transmission method may be formed in accordance with a technical standard called "ADASIS (Advanced Driver Assistance Systems Interface Specification)."

The path providing device 800 associated with the present disclosure may use information received from eHorizon for autonomous driving systems and/or infotainment systems.

For example, autonomous navigation systems may be divided into safety aspects and ECO aspects.

In terms of the safety aspect, the path providing device 800 according to the present disclosure may perform an ADAS (Advanced Driver Assistance System) function such as LKA (Lane Keeping Assist), TJA (Traffic Jam Assist) or the like, and/or an AD (AutoDrive) function such as advance, road joining, lane change or the like using road shape information and event information received from eHorizon and surrounding object information sensed through sensors (e.g., in the localization unit 840) provided in the vehicle.

Furthermore, in terms of the ECO aspect, the path providing device 800 may receive inclination information, traffic light information, and the like on a front road from eHorizon to control the vehicle so as to achieve efficient engine output, thereby enhancing fuel efficiency.

The infotainment system may include convenience aspects.

For an example, the path providing device 800 may receive accident information, road surface condition information, and the like on a front road received from eHorizon to output them on a display unit (for example, HUD (Head Up Display), CID, Cluster, etc.) provided in the vehicle to provide guide information for allowing the driver to perform safe driving.

Referring to FIG. 10, the eHorizon (external server) may receive the location information of various event information (e.g., road surface condition information 1010a, construction information 1010b, accident information 1010c, etc.) generated from a road and/or road specific speed limit information 1010d from the present vehicle 100 or other vehicles 1020a, 1020b or collect them from an infrastructure (e.g., a measuring device, a sensing device, a camera, etc.) installed on a road.

Furthermore, the event information and the road specific speed limit information may be linked to map information or may be updated.

In addition, the location information of the event information may be divided into units of lanes.

Using the information, the eHorizon (external server) of the present disclosure may provide information required for autonomous driving system and infotainment systems to each vehicle based on a precision map capable of determining a road situation (or road information) in units of lanes of the road.

In other words, the eHorizon (external server) of the present disclosure may provide an absolute high-definition map using an absolute coordinate of information (for example, event information, location information of the present vehicle 100, etc.) associated with a road based on a precision map.

The information associated with a road provided by the eHorizon may be provided only within a predetermined region (predetermined space) with respect to the present vehicle 100.

On the other hand, the path providing device 800 of the present disclosure may acquire location information of another vehicle through communication with the another vehicle. Communication with another vehicle may be carried out through V2X (vehicle to everything) communication, and data transmitted and received to and from another vehicle through V2X communication may be data in a format defined by the LDM (Local Dynamic Map) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the ADAS MAP described above in the data format and transmission method. For an example, the ADAS MAP corresponds to a high-definition map having absolute coordinates received from eHorizon (external server), and the LDM may denote a high-definition map having relative coordinates based on data transmitted and received through V2X communication.

The LDM data (or LDM information) is data that is mutually transmitted and received in V2X communication (vehicle to everything) (for example, V2V (vehicle to vehicle) communication, V2I (vehicle to infrastructure) communication, V2P (vehicle to pedestrian) communication.

The LDM may be implemented, for example, by a storage for storing data transmitted and received in V2X communication, and the LDM may be formed (stored) in a vehicle control device provided in each vehicle.

The LDM data may denote, for example, data that is mutually transmitted and received between a vehicle and a vehicle (infrastructure, pedestrian) or the like. The LDM data may include, for example, a Basic Safety Message (BSM), a Cooperative Awareness Message (CAM), a Decentralized Environmental Notification Message (DENM), and the like.

The LDM data may be referred to as, for example, a V2X message or an LDM message.

The vehicle control device related to the present disclosure may efficiently manage LDM data (or V2X message) transmitted and received between vehicles efficiently using an LDM.

Based on LDM data received through V2X communication, the LDM may store all relevant information (e.g., the present vehicle (another vehicle) location, speed, traffic light status, weather information, road surface condition, etc.) on a traffic condition (or a road condition for an area within a predetermined distance from a place where a vehicle is currently located) around a place where a vehicle is currently located, and distribute them to other vehicles and continuously update them.

For an example, a V2X application provided in the path providing device 800 registers with the LDM, and receives specific messages such as all DENMs including a warning about a faulty vehicle. Then, the LDM automatically allocates the received information to the V2X application, and the V2X application may control the vehicle based on information allocated from the LDM.

In this manner, the vehicle of the present disclosure may control the vehicle using an LDM formed by LDM data collected through V2X communication.

The LDM associated with the present disclosure may provide information related to a road to the vehicle control device. The information related to a road provided by the LDM provides only relative distances and relative speeds between other vehicles (or generated event points), other than map information with absolute coordinates.

In other words, the vehicle of the present disclosure may construct autonomous driving using an ADAS MAP (absolute coordinate high-definition map) according to the ADASIS standard provided by eHorizon, but the ADAS MAP may be used only to determine a road condition in a surrounding area of the present vehicle (an own vehicle).

In addition, the vehicle of the present disclosure may construct autonomous driving using an LDM (relative coordinate high-definition map) formed by LDM data received through V2X communication, but there is a limit in that accuracy is inferior due to insufficient absolute location information.

The vehicle control device included in the vehicle of the present disclosure may generate a merged precision map using the LDM data received through the VAS communication with the ADAS MAP received from eHorizon and controls the vehicle in an optimized manner using the fusion precision map (Self-driving).

Figure 11A:
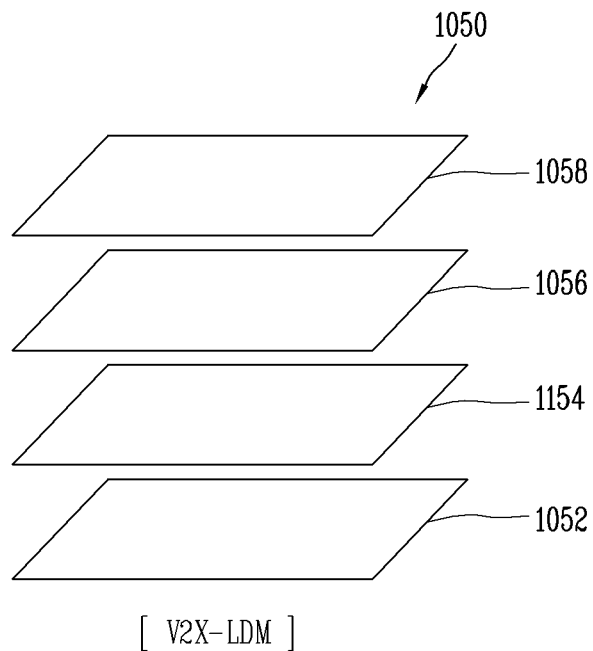
FIGS. 11A and 11B are diagrams illustrating examples of an LDM (Local Dynamic Map) and an ADAS (Advanced Driver Assistance System) MAP associated with implementations of the present disclosure.
Figure 11B:
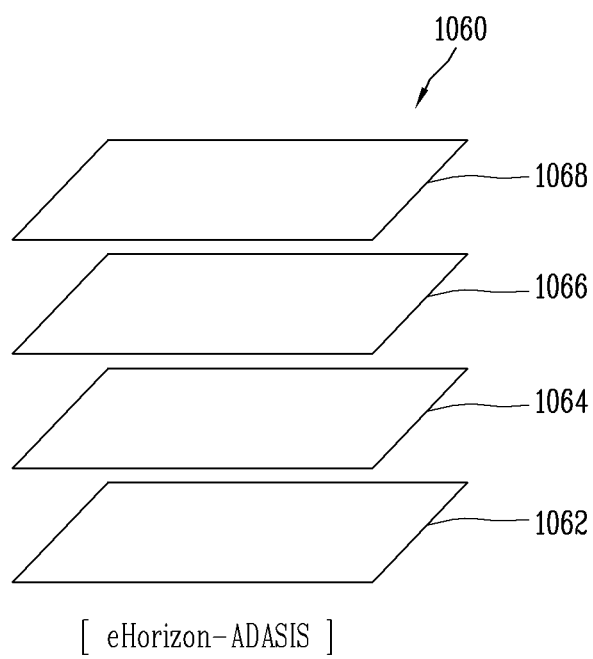

An example of a data format of the LDM data (or LDM) transmitted and received between vehicles through V2X communication is illustrated in FIG. 11A, and an example of a data format of the ADAS MAP received from an external server (eHorizon) is illustrated in FIG. 11B.

First, referring to FIG. 11A, the LDM data (or LDM) 1050 may have four layers.

The LDM data 1050 may include a first layer 1052, a second layer 1054, a third layer 1056, and a fourth layer 1058.

The first layer 1052 may be referred to as Type-1. The first layer 1052 may include static information, for example, map information, among information related to a road, as permanent static data.

The second layer 1054 may be referred to as Type-2. The second layer 1054 may include landmark information (e.g., specific place information specified by a maker among a plurality of place information included in the map information) among information related to the road, as transient static data. The landmark information may include location information, name information, size information, and the like. Moreover, the second layer 1054 may include road furniture located on a road such as guard rails or sign faces.

The third layer 1056 may be referred to as Type-3. The third layer 1056 may include information (e.g., traffic light information, construction information, accident information, etc.) among information related to the road, as transient dynamic data. The construction information, the accident information and the like may include location information. For example, construction section information, construction lane information, variable speed lane, road surface condition, traffic, and weather may be included in the third layer 1056.

The fourth layer 1058 may be referred to as Type-4. The fourth layer 1058 may include dynamic information (e.g., object information, pedestrian information, other vehicle information, etc.) among information related to the road, as highly dynamic data. The object information, pedestrian information, and other vehicle information may include location information. In other words, the fourth layer 1068 includes information related to a moving object, for example, pedestrian information, other vehicle information, bicycle information, and the like.

In other words, the LDM data 1050 may include information sensed through the sensing unit of another vehicle or information sensed through the sensing unit of the present vehicle, and may include information related to a road that is modified in real time as it goes from a first layer to a fourth layer.

Referring to the example of FIG. 11B, in some implementations, the ADAS MAP may be formed to have four layers similar to the LDM data.

The ADAS MAP 1060 may denote data received from eHorizon and formed to conform to the ADASIS standard.

The ADAS MAP 1060 may include a first layer 1062 to a fourth layer 1068.

The first layer 1062 may be referred to as a topology layer or a layer-1.

The first layer 1062 may include topology information. The topology information, as information that explicitly defines a spatial relationship, for an example, and may refer to map information. The first layer 1062 is suitably adapted to roughly display the location of the vehicle as a map made by connecting road center lines.

The second layer 1064 may be referred to as an ADAS layer or a layer-2.

The second layer 1064 may include landmark information (e.g., specific place information specified by a maker among a plurality of place information included in the map information) among information related to the road. The landmark information may include location information, name information, size information, and the like. The landmark information may include traffic sign information indicating speed limit, no-passing, slope, road bend curvature, and the like. The vehicle and/or an electrical part provided in the vehicle may display infotainment information or may execute engine output control, headlamp horizontal angle control, speed limit cruise control, and the like using information included in the second layer 1064.

The third layer 1066 may be referred to as a HD map and localization layer or layer-3.

The third layer 1066 may include detailed topology information of a road in units of lanes, connection information of each lane, and features for localization of a vehicle. Moreover, the third layer 1066 is provided with the attributes of a lane such as the color, shape, and type of a lane in units of lanes, and may include road furniture located on a road such as guard rails or sign faces.

The fourth layer 1068 may be referred to as a dynamic layer or layer-4.

The fourth layer 1068 may include various dynamic information that may occur on a road. For example, construction section information, construction lane information, variable speed lane, road surface condition, traffic, and weather may be included as dynamic information.

In other words, the ADAS MAP 1060 may include information related to a road that is modified in real time as it goes from the first layer to the fourth layer, such as the LDM data 1050.

The processor 830 may autonomously drive the vehicle 100.

For example, the processor 830 may autonomously drive the vehicle 100 based on vehicle driving information sensed from various electrical parts provided in the vehicle 100 and information received through the telecommunication control unit 810.

Specifically, the processor 830 may control the telecommunication control unit 810 to acquire the location information of the vehicle. For example, the processor 830 may acquire the location information (location coordinates) of the vehicle 100 through the location information unit 420 of the telecommunication control unit 810.

Furthermore, the processor 830 may control the first telecommunication control unit 812 of the telecommunication control unit 810 to receive map information from an external server. Here, the first telecommunication control unit 812 may receive an ADAS MAP from the external server (eHorizon). The map information may be included in the ADAS MAP.

Furthermore, the processor 830 may control the second telecommunication control unit 814 of the telecommunication control unit 810 to receive the location information of another vehicle from the another vehicle. Here, the second telecommunication control unit 814 may receive LDM data from another vehicle. The location information of the another vehicle may be included in the LDM data.

The another vehicle denotes a vehicle existing within a predetermined distance from the vehicle, and the predetermined distance may be a communication available distance of the telecommunication control unit 810 or a distance set by a user.

The processor 830 may control the telecommunication control unit to receive map information from an external server and the location information of another vehicle from the another vehicle.

In addition, the processor 830 may merge the acquired location information of the vehicle and the received location information of the another vehicle into the received map information, and control the vehicle 100 based on at least one of the merged map information and information related to the vehicle sensed through sensors (e.g., in the location unit 840).

Here, map information received from the external server may denote high-definition map information (HD-MAP) included in an ADAS MAP (e.g., ADAS MAP 1060 in FIG. 11B). For example, the high-definition map information may indicate information related to the road in units of lanes (e.g., particular lanes of a road).

The processor 830 may merge the location information of the present vehicle 100 and the location information of another vehicle into the map information in units of lanes (e.g., lanes of a road). In addition, the processor 830 may merge information related to the road received from an external server and information related to the road received from another vehicle into the map information in units of lanes (e.g., lanes of a road).

The processor 830 may generate an ADAS MAP necessary for the control of the vehicle using the ADAS MAP received from the external server and information related to the vehicle received through sensors (e.g., in the localization unit 840).

Specifically, the processor 830 may apply information related to the vehicle sensed within a predetermined range through sensors (e.g., in the localization unit 840) to map information received from the external server.

Here, the predetermined range may be an available distance from which an electrical part provided in the present vehicle 100 senses information, or may be a distance set by a user.

The processor 830 may apply the information related to the vehicle sensed within a predetermined range through the sensing unit to the map information and then additionally merge the location information of another vehicle therewith to control the vehicle.

In other words, when the information related to the vehicle sensed within a predetermined range through the sensing unit is applied to the map information, the processor 830 may use only the information within the predetermined range from the vehicle, and thus a range capable of controlling the vehicle may be geographically narrow.

However, the location information of another vehicle received through the V2X module may be received from the another vehicle existing in a space out of the predetermined range. It is because a communication available distance of the V2X module communicating with other vehicles through the V2X module is farther than a predetermined range of sensors (e.g., in the localization unit 840).

As a result, the processor 830 may merge the location information of other vehicles included in LDM data received through the second telecommunication control unit 814 with map information on which information related to the vehicle is sensed to acquire the location information of other vehicles existing in a wider range, and more effectively control the vehicle using the merged information.

For example, it is assumed that a plurality of other vehicles are densely packed forward in a lane in which the present vehicle exists, and also assumed that the sensing unit can sense only the location information of a vehicle right in front of the present vehicle.

In this case, when only information related to the vehicle sensed within a predetermined range is used in the map information, the processor 830 may generate a control command for controlling the vehicle to allow the present vehicle to pass and overtake a vehicle in front.

However, in reality, there may be a situation in which a plurality of other vehicles are densely packed forward, and it is not easy to pass and overtake.

At this time, the present disclosure may acquire the location information of other vehicles received through the V2X module. At this time, the received location information of the other vehicles may acquire the location information of not only a vehicle right in front of the present vehicle 100 but also a plurality of other vehicles in front of the front vehicle.

The processor 830 may additionally merge the location information of a plurality of vehicles acquired through the V2X module with map information to which information related to the vehicle is applied to determine whether it is an inadequate situation to pass and overtake a vehicle in front.

Through the foregoing configurations, implementations of the present disclosure may merge only information related to the vehicle acquired through sensors (e.g., in the localization unit 840) into high-definition map information to overcome the technical limitations of the related art that allows autonomous driving only in a predetermined range. As such, implementations of the present disclosure may use not only information related to another vehicle received from the another vehicle at a distance greater than the predetermined range through the V2X module, but may also use information related to the vehicle sensed through the sensing unit, thereby performing vehicle control in a more accurate and stable manner.

The vehicle control described in the present specification may include at least one of autonomously driving the vehicle 100 and outputting a warning message related to driving of the vehicle.

Hereinafter, a method of allowing the processor to control a vehicle using LDM data received through the V2X module, an ADAS MAP received from an external server (eHorizon), and information related to the vehicle sensed through the sensing unit provided in the vehicle will be described in more detail with reference to the accompanying drawings.

Figure 12A:
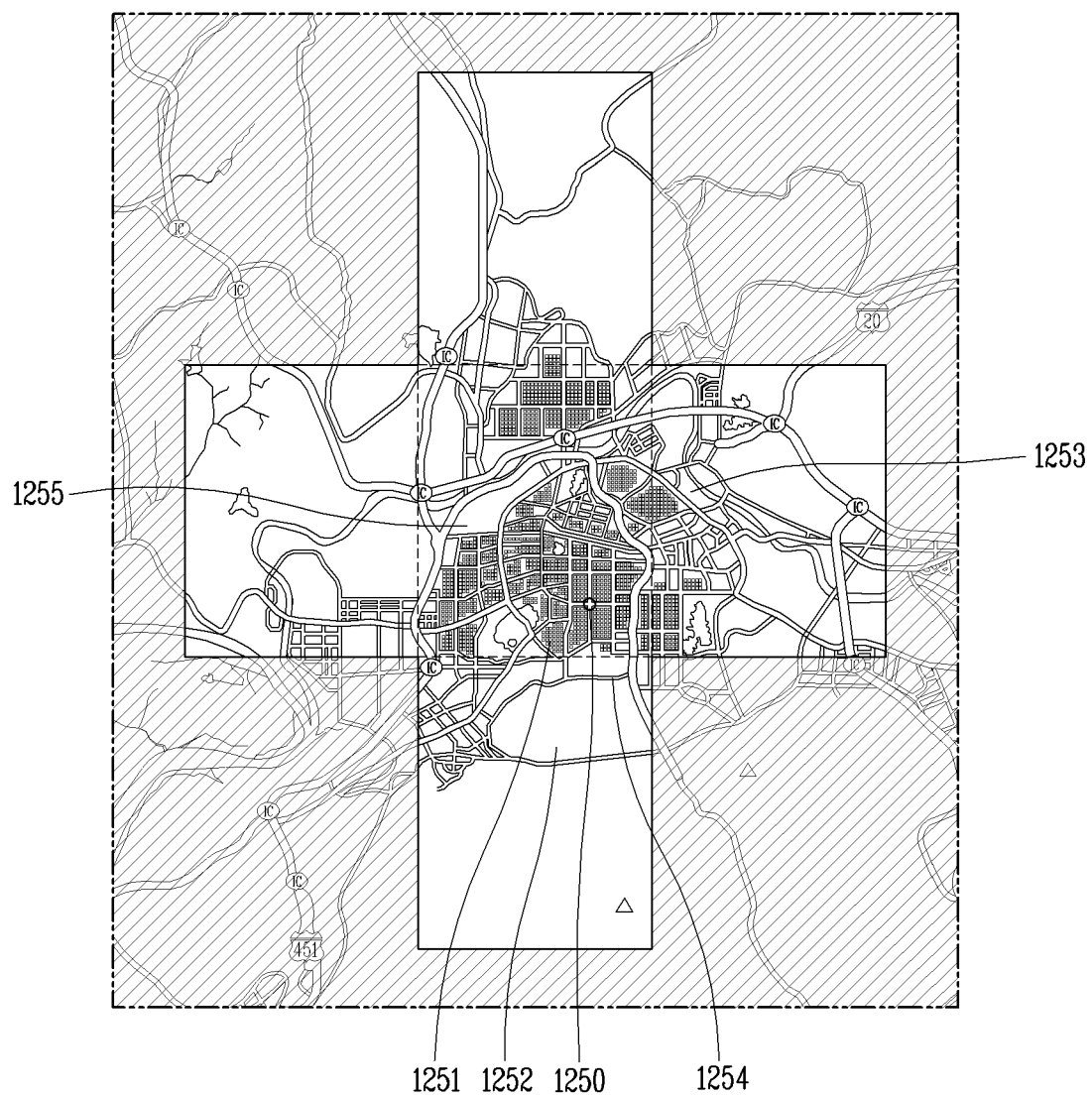

FIGS. 12A and 12B are exemplary diagrams illustrating a method of receiving a high-definition map data by a communication apparatus according to an implementation of the present disclosure.

In some implementations, the HD map data may be divided (e.g., by the server) into tile units, and the HD map data in tile units may be provided to the path providing device 800. The processor 830 may receive the HD map data in units of tiles (e.g., from a server or another vehicle) through the telecommunication control unit 810. Herein, the HD map data received in units of tiles is referred to as "HD map tiles" below.

As such, the HD map data may be partitioned into tiles. The tiles may have a predetermined shape, and each tile may correspond to a different part of the map. In some implementations, when all the tiles are connected, entire HD map data is acquired. In some implementations, the HD map data has a high capacity, and a high-capacity memory is implemented for the vehicle 100 to download and use the entire HD map data. However, in some implementations, it may be more efficient to download, use, and delete the HD map data in units of tiles rather than providing a high-capacity memory in the vehicle 100, with the development of communication technology.

In general, the tiles of the HD map data may be any suitable shape. However, in the present disclosure, for convenience of explanation, examples are described where tiles are a predetermined shape of a rectangle. However, the tiles of the HD map data may be any of various polygonal shapes.

The processor 830 may store the downloaded HD map tiles in the memory 140. The processor 830 may delete the stored HD map tiles. For example, the processor 830 may delete the HD map tiles when the vehicle 100 is moving away from a region corresponding to the HD map tiles. For example, the processor 830 may delete the HD map tiles after a preset period of time elapses subsequent to storing the HD map tiles.

FIG. 12A illustrates an example of HD map data that is partitioned into HD map tiles in a scenario when there is no preset destination. In this scenario, the processor 830 may receive a first HD map tile 1251 including the location 1250 of the vehicle 100. A server 21 may receive the location 1250 data of the vehicle 100 from the vehicle 100, and provide the first HD map tile 1251 including the location 1250 of the vehicle 100 to the vehicle 100. Furthermore, the processor 830 may receive HD map tiles 1252, 1253, 1254, 1255 around the first HD map tile 1251. For example, the processor 830 may receive the HD map tiles 1252, 1253, 1254, 1255 adjacent to the top, bottom, left, and right of the first HD map tile 1251, respectively. In this case, the processor 830 may receive a total of five HD map tiles. For example, the processor 830 may further receive a HD map tile located in a diagonal direction, along with the HD map tiles 1252, 1253, 1254, 1255 adjacent to the top, bottom, right, and left of the first HD map tile 1251, respectively. In this case, the processor 830 may receive a total of nine HD map tiles.

FIG. 12B illustrates an example of HD map data that is partitioned into HD map tiles in a scenario when there is a preset destination. As illustrated in FIG. 12B, when there is a preset destination, the processor 830 may receive a tile associated with a path from the location 1250 of the vehicle 100 to the destination. The processor 830 may receive a plurality of tiles to cover the path.

In some implementations, the processor 830 may receive the entire tiles covering the path at once.

Alternatively, in some implementations, the processor 830 may receive different tiles of the path at different times. For example, the processor 830 may divide and receive the tiles of the path while the vehicle 100 is moving along the path. The processor 830 may receive at least part of the entire tiles based on the location of the vehicle 100 while the vehicle 100 is moving along the path. Then, the processor 830 may continuously receive tiles (and may delete the received tiles) while the vehicle 100 is moving.

The processor 830 may generate electronic horizon data based on HD map data.

In some implementations, the vehicle 100 may be driven with the final destination being set (e.g., as in FIG. 12B). The final destination may be set based on a user input received through the user interface device 200 or the communication device 400. Depending on the implementation, the final destination may be set by the driving system 260.

With the final destination being set, the vehicle 100 may be located within a preset distance a first point while driving. When the vehicle 100 is located within a preset distance from the first point, the processor 830 may generate electronic horizon data having the first point as a starting point and the second point as an end point. The first point and the second point may be one point on a path to the final destination. The first point may be described as a point at which the vehicle 100 is located or to be located in the near future. The second point may be described by the horizon mentioned above.

The processor 830 may receive a HD map in a region including a section from the first point to the second point. For example, the processor 830 may request and receive a HD map for a region within a predetermined radius from the section from the first point to the second point.

The processor 830 may generate electronic horizon data for a region including the section from the first point to the second point based on the HD map. The processor 830 may generate horizon map data for a region including the section from the first point to the second point. The processor 830 may generate horizon pass data for a region including the section from the first point to the second point. The processor 830 may generate main pass 313 data for a region including the section from the first point to the second point. The processor 830 may generate sub pass 314 data for a region including the section from the first point to the second point.

When the vehicle 100 is located within a preset distance from the first point, the processor 830 may generate electronic horizon data having the second point as a starting point and a third point as an end point. The second point and the third point may be one point on a path to the final destination. The second point may be described as a point at which the vehicle 100 is located or to be located in the near future. The third point may be described by the horizon mentioned above. On the other hand, electronic horizon data having the second point as the starting point and the third point as the end point may be geographically connected to the foregoing electronic horizon data having the first point as the starting point and the second point as the end point.

The operation of generating electronic horizon data having the second point as the starting point and the third point as the end point may be applied with the foregoing electronic horizon data having the first point as the starting point and the second point as the end point.

According to an implementation, the vehicle 100 may be driven even when the final destination is not set.

Figure 13:
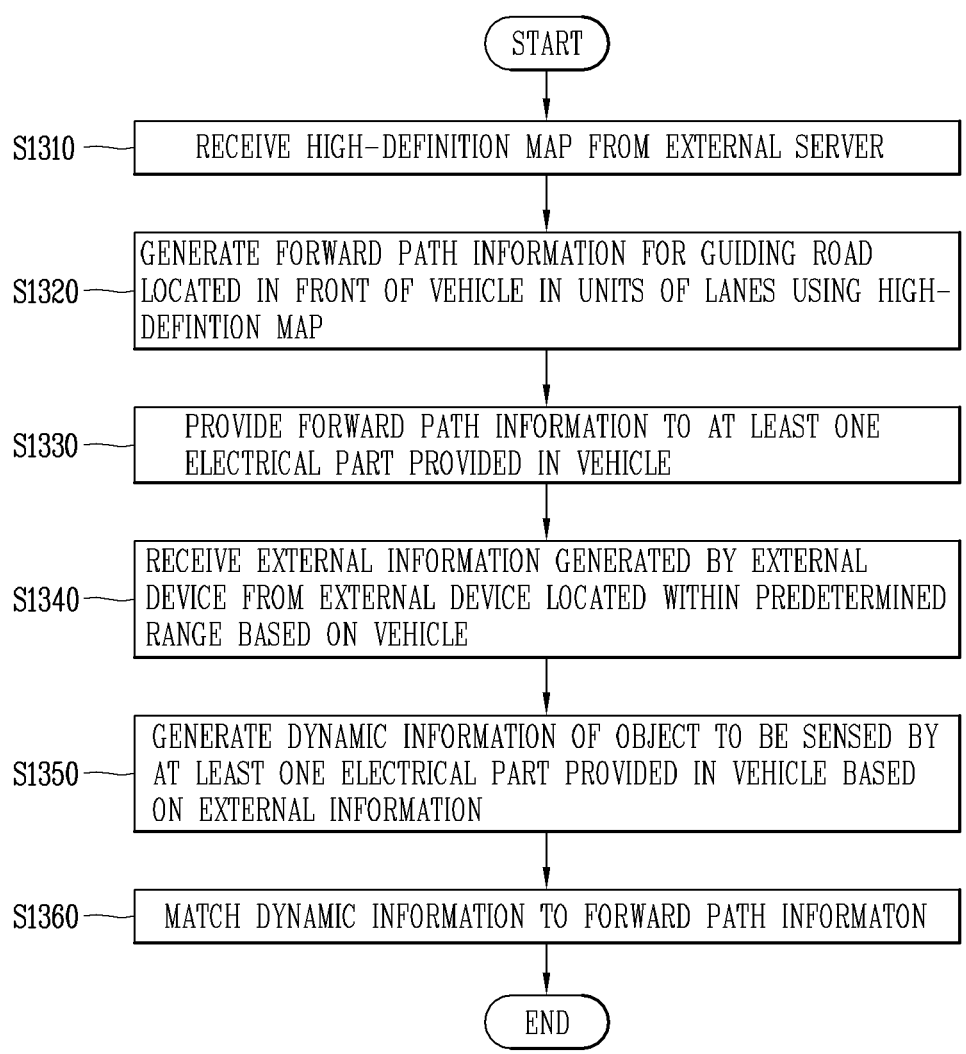
FIG. 13 is a flowchart illustrating an example of generating forward path information by receiving a high-definition map by the path providing device.

FIG. 13 is a flowchart for explaining a path providing method of the path providing device of FIG. 9.

The processor 830 receives a high-definition map from an external server (S1310).

The external server is an example of the telematics communication device 910 as a device capable of communicating through the first telecommunication control unit 812. The high-definition map may include at least one of the four layers described above with reference to FIG. 11B of an ADAS MAP 1060.

The processor 830 may generate forward path information for guiding the vehicle (e.g., along a road located in the front of the vehicle). The forward path information may be generated in units of lanes (e.g., units of lanes of the road in front of the vehicle) using the high-definition map (S1320).

Therefore, by utilizing the high-definition map which is partitioned into smaller tiles, the processor 830 may generate more detailed and precise forward path information that reflects particular lanes of the road.

In some implementations, the processor 830 may generate different forward path information depending on whether or not a destination has been set in the vehicle 100.

For example, when a destination has been set in the vehicle 100, then the processor 830 may generate forward path information for guiding a driving path to the destination in units of lanes (e.g., in units of lanes of a road).

By contrast, as another example, when no destination has been set in the vehicle 100, then the processor 830 may calculate a main path (e.g., a most preferred path, MPP) having a highest possibility on which the vehicle 100 may drive, and may generate the forward path information for guiding the main path (MPP) in units of lanes (e.g., units of lanes of a road). In this case, the forward path information may further include sub path information regarding sub paths that merge with or diverge from the most preferred path (MPP) for the vehicle 100 to be movable at a higher probability than a predetermined reference.

As such, by providing the forward path information in units of lanes, the forward path information may provide a driving path to the destination for each lane indicated on a road, thereby providing more precise and detailed path information. It may be path information conforming to the standard of ADASIS v3.

In some implementations, the forward path information may be provided by subdividing a path on which the vehicle must drive (or a path that the vehicle can drive) in units of lanes (e.g., lanes of a road). The forward path information may be information for guiding a driving path to a destination in units of lanes. When the forward path information is displayed on a display mounted on the vehicle 100, a guide line for guiding a lane (e.g., a lane of a road) that can be driven on the map may be displayed. Moreover, a graphic object indicating the location of the vehicle 100 may be included in at least one lane on which the vehicle 100 is located among a plurality of lanes included in the map.

Therefore, in some implementations, by utilizing a high-definition map that is partitioned into units of tiles, more detailed and precise forward path information may be generated according to units of lanes of the road.

The processor 830 may provide the forward path information to at least one electrical part provided in the vehicle (S1330). Moreover, the processor 830 may provide the forward path information to various applications installed in the system of the vehicle 100.

The electrical part refers to any device mounted on the vehicle 100 to allow communication, and may include the components 120-700 described above with reference to FIG. 7. For example, an object detecting apparatus 300 such as a radar and a lidar, a navigation system 770, a vehicle operating apparatus 600, and the like may be included in the electrical part.

The electrical part may perform its own function to be carried out based on the forward path information.

The forward path information may include a path in units of lanes and a location of the vehicle 100, and may include dynamic information including at least one object that must be sensed by the electrical part. The electrical part may reassign a resource to sense an object corresponding to the dynamic information, determine whether the dynamic information matches sensing information sensed by itself, or change a setting value for generating sensing information.

Next, the processor 830 may receive external information generated by an external device from the external device located within a predetermined range with respect to the vehicle (S1340).

The predetermined range is a distance at which the second telecommunication control unit 914 can perform communication, and may vary according to the performance of the second telecommunication control unit 914. When the second telecommunication control unit 914 performs V2X communication, a V2X communication range may be defined as the predetermined range.

Moreover, the predetermined range may vary according to an absolute speed of the vehicle 100 and/or a relative speed with respect to the external device.

The processor 830 may determine the predetermined range based on the absolute speed of the vehicle 100 and/or the relative speed with respect to the external device, and allow communication with an external device located within the determined predetermined range.

Specifically, external devices capable of communicating through the second telecommunication control unit 914 may be classified into a first group or a second group based on the absolute speed of the vehicle 100 and/or the relative speed with respect to the external device. External information received from an external device included in the first group is used to generate dynamic information described below, but external information received from an external device included in the second group is not used to generate the dynamic information. Even when external information is received from an external device included in the second group, the processor 830 ignores the external information.

The processor 830 may generate dynamic information of an object that must be sensed by at least one electrical part provided in the vehicle based on the external information (S1350), and may match the dynamic information to the forward path information (S1360).

For an example, the dynamic information may correspond to the fourth layer described above with reference to FIGS. 11A and 11B.

As described above in FIGS. 11A and 11B, the path providing device 800 may receive ADAS MAP and/or LDM data. Specifically, the ADAS MAP may be received from the telematics communication device 910 through the first telecommunication control unit 812 and the LDM data may be received from the V2X communication device 920 through the second telecommunication control unit 814.

The ADAS MAP and the LDM data may be composed of a plurality of layers having the same format. The processor 830 may select at least one layer from the ADAS MAP, select at least one layer from the LDM data, and generate the forward path information composed of the selected layers.

For example, the processor 830 may select the first to third layers of the ADAS MAP, select the fourth layer of the LDM data, and generate one forward path information in which four layers are combined into one. In this case, the processor 830 may transmit a reject message for rejecting the transmission of the fourth layer to the telematics communication device 910. It is because the first telecommunication control unit 812 uses less resources to receive some information excluding the fourth layer than to receive all the information including the fourth layer. Part of the ADAS MAP may be combined with part of the LDM data to use mutually complementary information.

For another example, the processor 830 may select the first to fourth layers of the ADAS MAP, select the fourth layer of the LDM data, and generate one forward path information in which five layers are combined into one. In this case, priority may be given to the fourth layer of the LDM data. When there is discrepancy information that does not match the fourth layer of the LDM data in the fourth layer of the ADAS MAP, the processor 830 may delete the discrepancy information or correct the discrepancy information based on the LDM data.

The dynamic information may be object information for guiding an object. For example, at least one of a location coordinate for guiding the location of the object, and information for guiding the shape, size, and type of the object may be included in the dynamic information.

The object may denote an object that obstructs driving in the corresponding lane among objects that can drive on a road.

For example, the object may include a bus stopping at a bus stop, a taxi stopping at a taxi stop, a truck dropping a courier, and the like.

For another example, the object may include a garbage collection vehicle driving at a constant speed or below, or a large vehicle (e.g., truck or container truck, etc.) determined to obstruct view.

For still another example, the object may include an object indicating an accident, road damage, or construction.

As described above, the object may include all types of objects disallowing the driving of the present vehicle 100 or obstructing the lane not to allow the vehicle 100 to drive. Traffic signals such as ice roads, pedestrians, other vehicles, construction signs, and traffic lights to be avoided by the vehicle 100 may correspond to the object and may be received by the path providing device 800 as the external information.

Meanwhile, the processor 830 may determine whether an object guided by the external information is located within a reference range based on the driving path of the vehicle 100.

Whether or not the object is located within the reference range may vary depending on the lane on which the vehicle 100 drives and the location of the object. For example, external information for guiding a sign indicating the construction of a third lane ahead 1 km while driving on a first lane may be received. When the reference range is set to 1 m with respect to the vehicle 100, the sign is located out of the reference range. It is because when the vehicle 100 continues to drive on the first lane, the third lane is located out of 1 m with respect to the vehicle 100. On the contrary, when the reference range is set to 10 m with respect to the vehicle 100, the sign is located within the reference range.

The processor 830 generates the dynamic information based on the external information when the object is located within the reference range, but does not generate the dynamic information when the object is located out of the reference range. In other words, the dynamic information may be generated only when the object guided by the external information is located on a driving path of the vehicle 100 or within a reference range capable of affecting the driving path of the vehicle 100.

Since the path providing device according to the present disclosure combines information received through the first telecommunication control unit and information received through the second telecommunication control unit into one information during the generation of forward path information, optimal forward path information in which information provided through different telecommunication control units are mutually complemented. It is because the information received through the first telecommunication control unit has a restriction in that it is unable to reflect the information in real time, but the information received through the second telecommunication control unit complements the real-time property.

Moreover, since when there is information received through the second telecommunication control unit, the processor 830 controls the first telecommunication control unit so as not to receive the corresponding information, it may be possible to use the bandwidth of the first telecommunication control unit less than the related art. In other words, the resource use of the first telecommunication control unit may be minimized.

Figure 14:
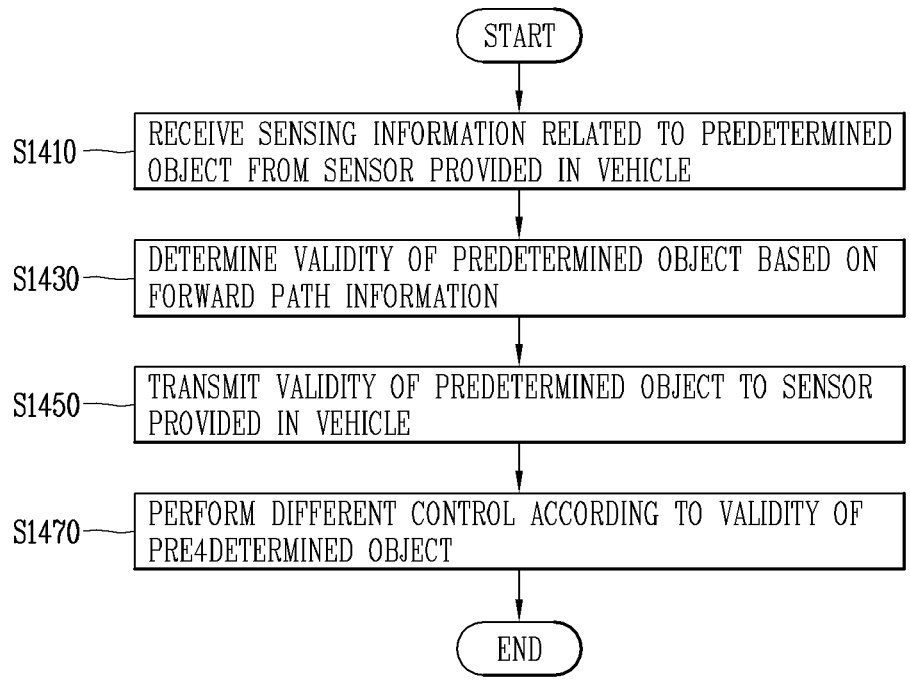
FIG. 14 is a flowchart illustrating an example of determining validity of an object by the path providing device.

FIG. 14 is a flowchart illustrating an example of determining a validity of an object by the path providing device. The object may be any suitable object that is located outside of the vehicle 100, and may be, for example, another vehicle or other external object.

As used herein, the "validity" of an object relates to whether the object is likely to affect driving operations of the vehicle 100. For example, the validity of an object may depend on the location of the object relative to the vehicle 100.

In some implementations, the processor 830 may receive a high-definition map data from one or more computers (e.g., a server or the like). The processor 830 may generate forward path information for the vehicle, based on the high-definition map data.

For example, if a destination has been set for the vehicle, then the forward path information may simply indicate a path to the destination. As another example, if a destination has not been set for the vehicle, then the forward path information may indicate a path along which the vehicle is likely to travel (e.g., most likely to travel). In one or more of these scenarios, the forward path information may be generated by using the high-definition map data that has been received from the server. As an example, the server corresponds to an example of the telematics communication device 910.

The processor 830 may receive sensing information related to an object from a sensor provided in the vehicle 100 (S1410). The object may be any suitable object outside the vehicle 100. For example, the object may be another vehicle.

In some implementations, the at least one sensor may be an electrical part that is provided in the vehicle 100, in which case the sensing information corresponds to one example of the vehicle driving information (or vehicle travel information).

The processor 830 may determine validity of the object based on the forward path information (S1430).

The validity of the object may generally relate to whether the object is likely to affect one or more driving operations of the vehicle 100. For example, another vehicle which is traveling along the same path may be determined to be an object that is "valid" because it is likely to affect the driving of the vehicle 100. By contrast, if the other vehicle is traveling in an opposite direction (e.g., at an opposite side of the road) as the vehicle 100 (e.g., based on a central line of the road), then the object may be determined to be "invalid" because it is not likely to affect the driving of the vehicle 100.

In some implementations, the forward path information is used as a reference for determining whether an object is valid or invalid (e.g., whether another vehicle is traveling along the same path as the vehicle 100). In general, the processor 830 may determine whether the object is valid or invalid according to a preset criterion using the forward path information.

The processor 830 may transmit the validity of the object to one or more sensors provided in the vehicle 100 through the interface unit (S1450).

In some implementations, various sensing operations of the vehicle 100 may be adjusted based on whether the object is valid or invalid.

For example, if the object is determined to be valid, the one or more sensors may continuously monitor the object and perform operations for sensing the object.

On the other hand, for example, if the object is determined to be invalid, then the one or more sensors may reduce the monitoring (e.g., stop the monitoring) for the object. In such scenarios, for example, even if the object is sensed, the sensor(s) may not actually generate sensing information related to the object. As such, by reducing (or eliminating) sensing information for invalid objects, implementations disclosed herein may have benefits such as reducing sensing, processing, and storage requirements, and/or reducing occurrences of false alarms for various safety operations of the vehicle 100.

The processor 830 may perform various different controls according to the validity of the object (S1470).

First, some examples of the case where the object is invalid will be described.

If the object is invalid, then the processor 830 may transmit a control message through the interface unit 820 to control one or more sensors provided in the vehicle 100 to reduce sensing (or not to sense) the object. For example, the one or more sensors may stop sensing the object or stop generating the sensing information related to the object, in response to the control message. This may result in saving resources of the one or more sensors and reducing loads of the one or more sensors.

As another example, if the object is invalid, then the processor 830 may restrict an execution of at least one function which can be executed in the vehicle 100. For example, even if a blind spot detection (BSD) function for notifying an object located in the blind spot should be executed for the object, the execution of the BSD function is restricted when the object is determined to be invalid. According to the present disclosure, an unnecessary execution of a specific function by an object which does not affect the driving of the vehicle 100 is prevented in advance.

By contrast, if the object is valid, then the processor 830 may provide object information related to the object to one or more other sensors (e.g., sensors other than the sensors which initially sensed the object) that are provided in the vehicle 100, so that the other sensors can additionally sense the object. As such, the processor 830 provides the object information to these other sensors, which have not initially sensed the object, so that these other sensors can also sense the object and provide additional sensing information for the object. For example, the other sensors which have received the object information may perform an additional operation for sensing the object by adjusting sensitivity or a sensing range.

Figure 15:
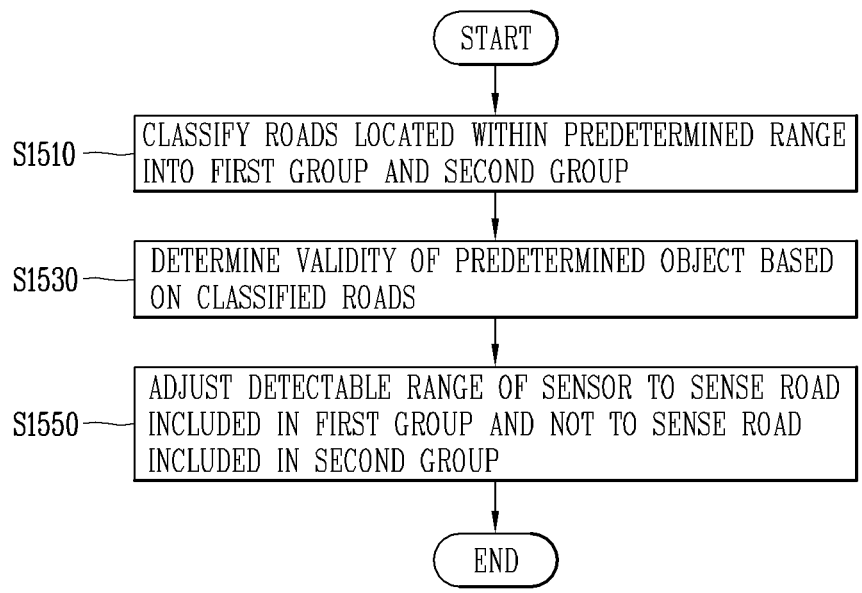
FIG. 15 is a flowchart illustrating an example of determining validity of an object by the path providing device based on a road.
Figure 16:
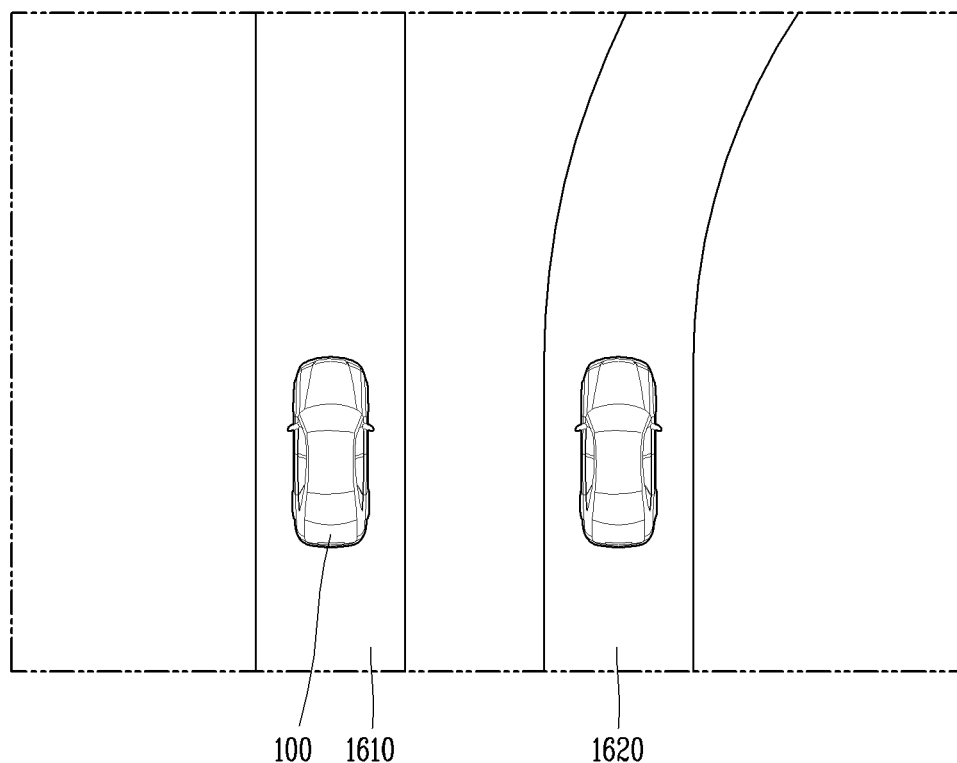
FIG. 16 is diagram illustrating an example of the method of FIG. 15 in more detail.

FIG. 15 is a flowchart illustrating a method of determining, by a path providing apparatus, validity of an object based on a road, and FIG. 16 is an exemplary view illustrating the method of FIG. 15 in more detail.

The processor 830 may classify roads located within a predetermined range into a first group and a second group (S1510).

The processor 830 may classify the roads located in the predetermined range into the first group and the second group by using the forward path information.

The predetermined range may correspond to a range in which one or more sensors provided in the vehicle 100 can sense the object. The predetermined range may be set differently depending on performance of the one or more sensors provided in the vehicle 100.

At least one of shape and size of the predetermined range may vary according to at least one of speed and position of the vehicle 100.

For example, as the speed of the vehicle 100 increases, the predetermined range may be wider. Or, the predetermined range may change from a circular shape into a shape of more covering the front of the vehicle 100. This is to further enhance safety of the vehicle 100.

At least one of the shape or the size of the predetermined range may vary according to characteristics of a road located at the position of the vehicle 100. For example, the predetermined range may change to more cover a left side of the vehicle 100 so that sensors can sense a road-merged direction in a ramp section where a road located at the left side of the vehicle 100 is merged.

The processor 830 may extract an expected driving lane, on which the vehicle 100 is expected to be driven, based on the forward path information. A road including the expected driving lane is classified into a first group that affects the driving of the vehicle 100.

On the other hand, a road which do not include the expected driving lane and cannot affect the driving of the vehicle 100 is classified into a second group.

If a destination has not been set for the vehicle 100, then the forward path information includes a main path having highest probability that the vehicle 100 travels thereon and at least one sub path different from the main path but having probability that the vehicle 100 travels, higher than a reference probability. A road corresponding to the main path and a road corresponding to the sub path may be classified into the first group.

The processor 830 may classify, into the first group, a main road corresponding to the forward path information, and a sub road through which another vehicle can enter the main road according to a preset criterion, among those roads. The remaining roads other than the main road and the sub road among the roads may be classified into the second group.

The roads located in the predetermined range may be classified into the first group or the second group depending on whether the object is located on the main road on which the vehicle 100 is being driven, and/or whether probability that the object enters the main road is higher than a reference.

The processor 830 may determine validity of the object based on the classified roads (S1530).

The processor 830 determines that the object is valid when the object is located on a road belonging to the first group, and determine that the object is invalid when the object is located on a road belonging to the second group.

For example, referring to FIG. 16, another vehicle 1620 is located on a road that cannot affect the vehicle 100 based on a forward path 1610 of the vehicle 100. That is, since the another vehicle 1620 is located on a road of the second group, the another vehicle 1620 is detected by the sensor provided in the vehicle 100 but is determined to be invalid.

The processor 830 may adjust a detectable range (or sensing range) of the sensor so as to sense a road included in the first group and not sense a road included in the second group (S1550).

For example, referring to FIG. 16, the road in which the another vehicle 1620 is located corresponds to the road of the second group that does not affect the driving of the vehicle 100. Therefore, since the sensor provided in the vehicle 100 does not need to detect or sense the road of the second group, the detectable range or sensing range for a right side of the vehicle based on a driving direction of the vehicle 100 can be reduced. This saves resources of the sensor.

Figure 17:
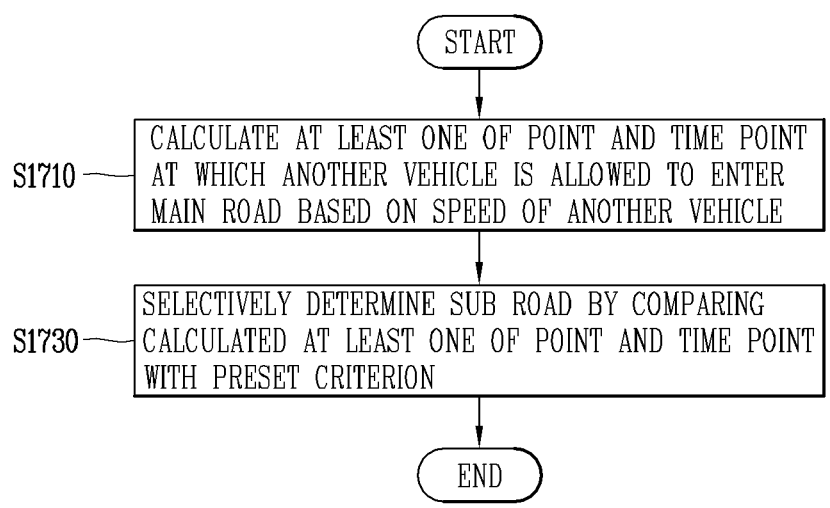
FIG. 17 is a flowchart illustrating a method of distinguishing a road to determine validity of an object.

FIG. 17 is a flowchart illustrating a method of distinguishing a road for determining validity of an object.

The processor 830 may extract a main road corresponding to the forward path information among roads located within a predetermined range based on the position of the vehicle 100. In addition, a sub road through which another vehicle can enter the main road according to a preset criterion may be searched for.

In detail, the processor 830 may calculate at least one of a location or a time point at which another vehicle can enter the main road, based on speed of the another vehicle (S1710).

The at least one of the location point or the time point at which the another vehicle can enter the main road may be calculated, based on the high-definition map data, using the speed and the position of the another vehicle.

The processor 830 may selectively determine a sub road by comparing the calculated at least one of the point and the time point with a preset criterion (S1730).

The preset criterion is defined by whether the another vehicle is located in the predetermined range based on the vehicle 100 when the another vehicle enters the main road at the calculated at least one of the point and the time point. For example, when it is expected that another vehicle which is located on another road other than the main road at the current time point is entering the main road after a time point t and then is to be located within a predetermined range based on the vehicle 100 after a time point t, the another vehicle corresponds to a valid object to be continuously monitored by sensors. Therefore, the road on which the another vehicle is traveling may be determined as a sub road.

The sub road differs depending on at least one of speed of the vehicle and speed of the another vehicle.

Figure 18:
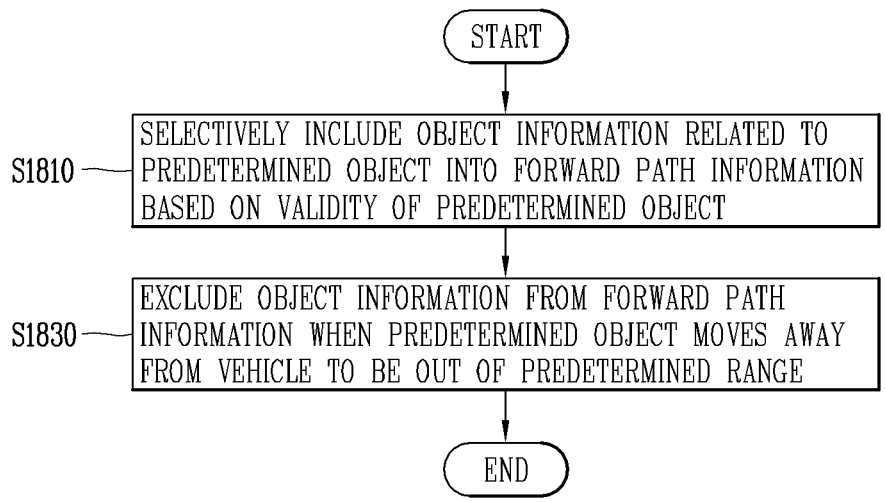
FIG. 18 is a flowchart illustrating an example of updating forward path information according to validity of an object.

FIG. 18 is a flowchart illustrating an example of updating forward path information according to validity of an object.

The processor 830 may selectively include object information related to the object in the forward path information according to the validity of the object (S1810).

The forward path information may include dynamic information for guiding a moving object such as another vehicle. If the object is valid, the object information for guiding the object to be continuously sensed is included in the forward path information. If the object is invalid, the object information is not included in the forward path information.

The processor 830 may exclude the object information from the forward path information when the object moves out of the predetermined range from the vehicle (S1830).

Since the sensors no longer need to sense the object when the object moves out of the predetermined range, the processor 830 may delete the object information included in the forward path information, or operate such that the object information is not included in the forward path information any more.

Figure 19:
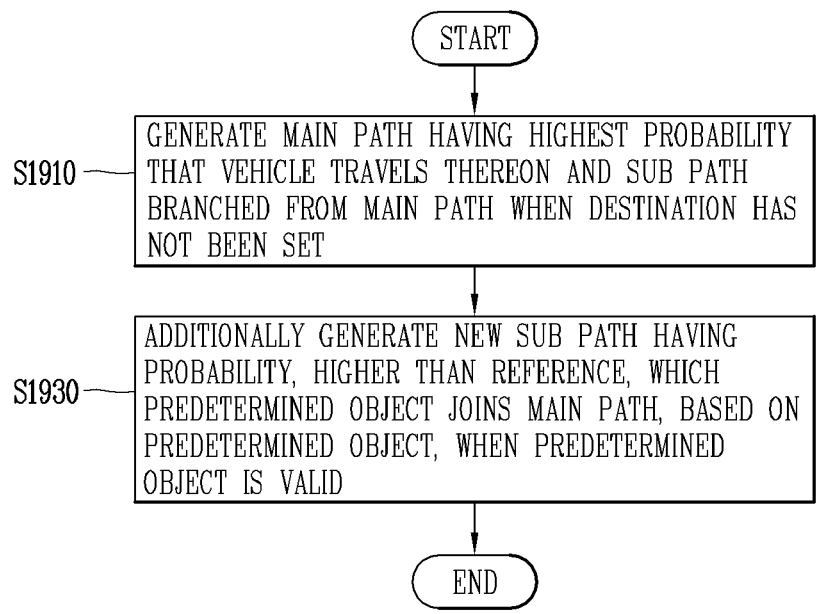
FIG. 19 is a flowchart illustrating an example of generating a new sub path.
Figure 20A:
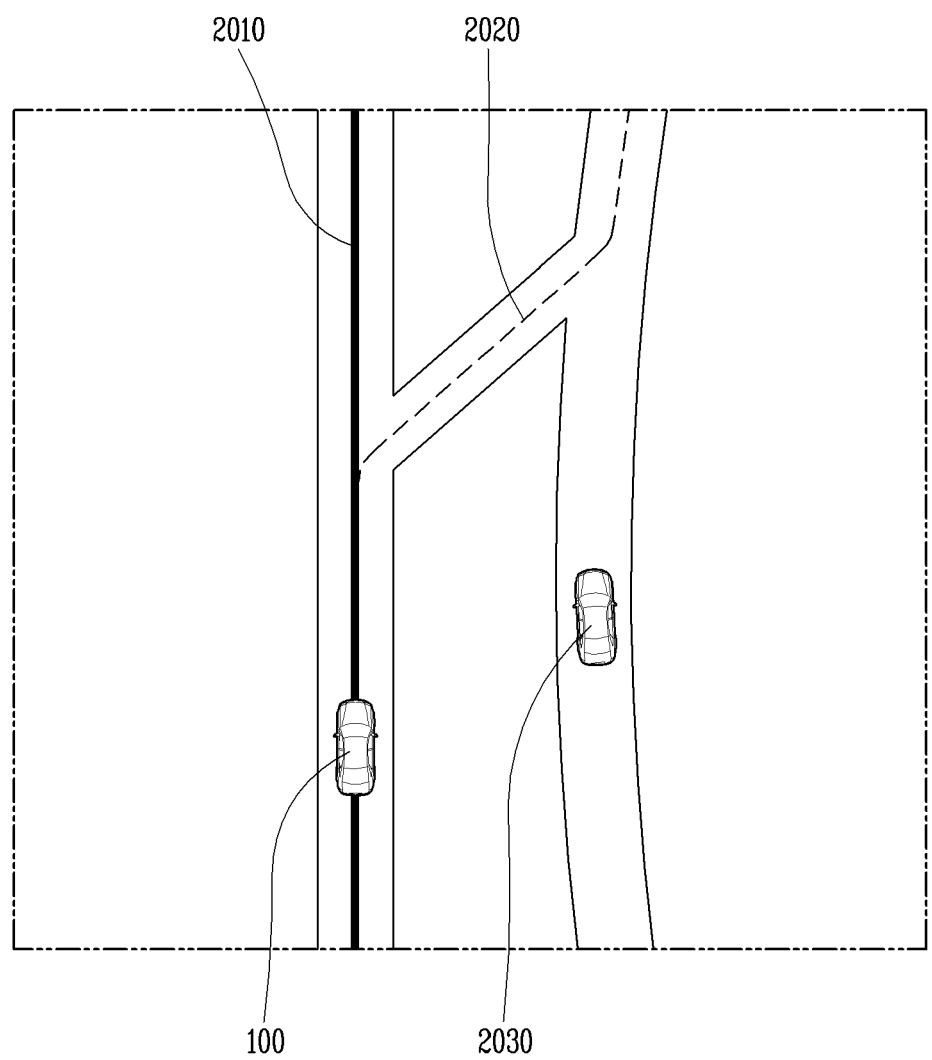
FIGS. 20A and 20B are diagrams illustrating examples of the method of FIG. 19 in more detail.
Figure 20B:
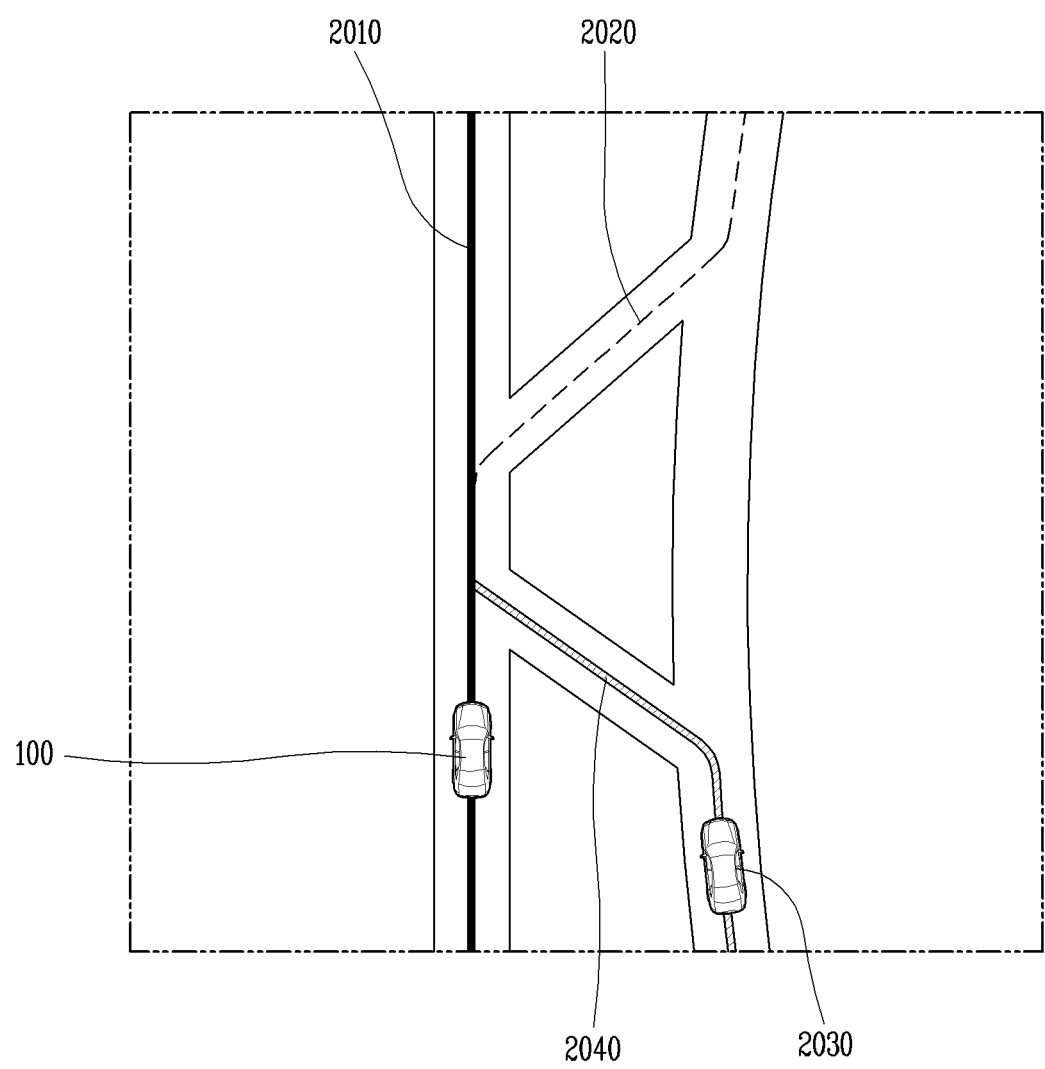

FIG. 19 is a flowchart illustrating an example of generating a new sub path, and FIGS. 20A and 20B are diagrams illustrating examples of the method of FIG. 19 in more detail.

When a destination has not been set in the vehicle 100, the processor 830 may generate a main path having the highest probability that the vehicle 100 is driven thereon and a sub path that merges with the main path (S1910).

For example, as illustrated in FIG. 20A, a main path 2010 and a sub path 2020 of the vehicle 100 may be generated. The main path may be one, but the sub path may be plural.

When the object is valid, the processor 830 may additionally generate a new sub path with probability that the object joins the main path, which is higher than a reference probability (S1930).

Referring to FIG. 20A, another vehicle 2030 is located on a road other than the main path and the sub path. Since the road on which the another vehicle 2030 is located may be merged with the main path within a predetermined range based on the vehicle 100, the road on which the another vehicle 2030 is located is selected as a sub road according to the method described above with reference to FIG. 17 and is included in the first group. Therefore, the another vehicle 2030 is determined to be valid.

The forward path information includes object information for guiding the another vehicle 2030, but does not include information related to the road where the another vehicle 2030 is located. This is because the forward path information includes only the main path and the sub path.

The processor 830 may generate the road, on which the another vehicle 2030 is located, as a new sub path, and may include information related to the new sub path 2040 in the forward path information. Accordingly, the sensors provided in the vehicle 100 can obtain information related to the another vehicle 2030 based on the object information, and acquire information related to the road on which the another vehicle 2030 is located based on the information related to the new sub path 2040.

According to the present disclosure, when another vehicle is detected around the vehicle, the path providing device determines whether the sensors provided in the vehicle have to continuously monitor the another vehicle. When the another vehicle is determined to be invalid, the sensors exclude the another vehicle from objects to sense. This results in preventing unnecessary waste of resources in advance. The sensors can be operated only under a necessary situation according to the determination as to the validity of the path providing device, thereby reducing loads and efficiently managing energy.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A path providing device configured to provide a path for a vehicle, the device comprising:
   a telecommunication unit;
   an interface unit;
   at least one processor; and
   at least one computer memory operably connectable to the at least one processor and storing instructions that, based on being executed by the at least one processor, perform operations comprising:
      receiving, through the telecommunication unit, high-definition map data from a server,
      generating forward path information for the vehicle based on the high-definition map data,
      receiving, through the interface unit from at least one sensor provided in the vehicle, sensing information related to an object outside the vehicle, and
      determining a validity of the object based on the forward path information,
   wherein the validity of the object relates to whether the object is likely to affect one or more driving operations of the vehicle,
   wherein generating the forward path information comprises:
      based on a destination having been set for the vehicle, generating, based on the high-definition map data, the forward path information to comprise a path to the destination, and
      based on the destination not having been set for the vehicle, generating, based on the high-definition map data, the forward path information to comprise a path on which the vehicle is most likely to travel,
   wherein determining the validity of the object comprises:
      classifying a plurality of roads, which are located within a predetermined range from the vehicle, into a first group and a second group, based on the forward path information, and
   wherein the operations further comprise:
      classifying, into the first group, (i) a main road, among the plurality of roads, that corresponds to the forward path information, and (ii) a sub road, among the plurality of roads, through which another vehicle is allowed to enter the main road, and
      classifying, into the second group, remaining roads, among the plurality of roads, except for the main road and the sub road,
      determining the object to be invalid based on the object being located on a road of the second group,
      adjusting a detectable range of the at least one sensor such that the at least one sensor senses the road included in the first group and does not sense the road included in the second group, and
      controlling the at least one sensor not to sense the object that is determined to be invalid.

2. The device of claim 1, wherein determining the validity of the object further comprises:
   determining the object to be valid based on the object being located on a road of the first group.

3. The device of claim 1, wherein the operations further comprise:
   calculating, based on a speed of the object, at least one of a location or a time at which the object is allowed to enter the main road; and
   selectively determining the sub road based on comparing (i) the calculated at least one of the location or the time with (ii) a preset criterion.

4. The device of claim 3, wherein the sub road differs depending on at least one of a speed of the vehicle or a speed of the object.

5. The device of claim 1, wherein the operations further comprise:
   transmitting, through the interface unit, the forward path information to at least one additional sensor, other than the at least one sensor, provided in the vehicle.

6. The device of claim 5, wherein the operations further comprise:
   selectively including, in the forward path information according to the validity of the object, object information related to the object.

7. The device of claim 6, wherein the operations further comprise:
   excluding the object information from the forward path information based on the object moving out of a predetermined range from the vehicle.

8. The device of claim 1, wherein the operations further comprise:
   transmitting, through the interface unit and based on a determination that the object is invalid, a control message for controlling the at least one sensor not to sense the object.

9. The device of claim 1, wherein the operations further comprise:
   based on a determination that the object is invalid, restricting at least one function that is executable in the vehicle from being executed as related to the object.

10. The device of claim 1, wherein the operations further comprise:
    based on a determination that the object is valid, providing, to other sensors provided in the vehicle, object information related to the object for the other sensors to sense the object.

11. The device of claim 1, wherein the operations further comprise:
    based on determining that the object is invalid, controlling the at least one sensor to reduce an amount of sensing information that is generated by the at least one sensor for the object.

12. The device of claim 1, wherein the operations further comprise:

transmitting, through the interface unit to the sensor provided in the vehicle, information regarding the validity of the object.

13. The device of claim 1, wherein the operations further comprise:
based on the destination not having been set, generating (i) a main path on which the vehicle is most likely to travel, and (ii) a sub path that merges with the main path; and
based on a determination that the object is valid, generating a new sub path for which a probability that the object merges onto the main path via the sub path is greater than a threshold.

14. The device of claim 1, wherein the remaining roads are classified into the second group based on determining that another vehicle in any of the remaining roads is not allowed to enter the main road and is not likely to affect the one or more driving operations of the vehicle.

15. The device of claim 1, wherein the operations further comprise:
determining that the object is located at a predetermined position relative to the vehicle;
based on a determination that the object is located at the predetermined position relative to the vehicle, determining whether the object is located at the road included in the first group or at the road included in the second group;
based on a determination that the object is located at the road included in the first group, controlling the vehicle to execute a predetermined function; and
based on a determination that the object is located at the road included in the second group, restricting execution of the predetermined function.

16. A method of controlling a path providing device for providing a path for a vehicle, the method comprising:
receiving high-definition map data from a server;
generating forward path information for the vehicle based on the high-definition map data;
receiving, from at least one sensor provided in the vehicle, sensing information related to an object outside the vehicle; and
determining a validity of the object based on the forward path information, wherein the validity of the object relates to whether the object is likely to affect one or more driving operations of the vehicle,
wherein generating the forward path information comprises:
based on a destination having been set for the vehicle, generating, based on the high-definition map data, the forward path information to comprise a path to the destination, and
based on the destination not having been set for the vehicle, generating, based on the high-definition map data, the forward path information to comprise a path on which the vehicle is most likely to travel,
wherein determining the validity of the object comprises:
classifying a plurality of roads, which are located within a predetermined range from the vehicle, into a first group and a second group, based on the forward path information, and
wherein the method further comprises:
classifying, into the first group, (i) a main road, among the plurality of roads, that corresponds to the forward path information, and (ii) a sub road, among the plurality of roads, through which another vehicle is allowed to enter the main road, and
classifying, into the second group, remaining roads, among the plurality of roads, except for the main road and the sub road,
determining the object to be invalid based on the object being located on a road of the second group,
adjusting a detectable range of the at least one sensor such that the at least one sensor senses the road included in the first group and does not sense the road included in the second group, and
controlling the at least one sensor not to sense the object that is determined to be invalid.

17. The method of claim 16, wherein the determining the validity of the object further comprises:
determining the object to be valid based on the object being located on a road of the first group.

18. The method of claim 16, further comprising:
selectively including, in the forward path information according to the validity of the object, object information related to the object; and
transmitting the forward path information including the object information to sensors provided in the vehicle.

19. The method of claim 16, further comprising:
based on a determination that the object is invalid, restricting at least one function that is executable in the vehicle from being executed as related to the object.

* * * * *